United States Patent
Okamoto et al.

[11] Patent Number: 5,982,728
[45] Date of Patent: Nov. 9, 1999

[54] READING INFORMATION FROM A DISK-SHAPED RECORDING MEDIUM THAT IS ROTATABLE AT A PLURALITY OF SPEEDS

[75] Inventors: Koujirou Okamoto, Suita; Masayoshi Nakamura; Toshihiko Mizukami, both of Hirakata, all of Japan

[73] Assignee: Matsushita Electric Industrial Co., Ltd., Osaka, Japan

[21] Appl. No.: 08/898,548

[22] Filed: Jul. 22, 1997

[30] Foreign Application Priority Data

Jul. 25, 1996 [JP] Japan .................................. 8-195893

[51] Int. Cl.⁶ .................................................. G11B 7/00
[52] U.S. Cl. .................................................. 369/54; 360/50
[58] Field of Search .................................. 369/50, 47, 54, 369/58

[56] References Cited

U.S. PATENT DOCUMENTS 5,528,574  6/1996  Takeuchi et al. .................... 369/50
5,790,488  8/1998  Uemura .................................. 369/50

FOREIGN PATENT DOCUMENTS 762416  3/1997  European Pat. Off. .

*Primary Examiner*—Thang V. Tran
*Attorney, Agent, or Firm*—Greenblum & Bernstein, P.L.C.

[57] ABSTRACT

A reproducing apparatus for disk-shaped recording medium rotationally drives the disk-shaped recording medium at a particular speed to read information from a recording track disposed circumferentially to the center of the recording surface with information recorded at a constant linear velocity. A pickup means scans the recording track and generating a first reproduction signal. A first rotational drive control means rotates the disk-shaped recording medium at a constant linear velocity based on the reproduction signal, and a second rotational drive control means rotates the disk-shaped recording medium at a constant angular velocity. A rotational drive control means selection means selects the first rotational drive control means or the second rotational drive control means based on the position of the pickup means when reproducing the disk.

17 Claims, 25 Drawing Sheets

READING INFORMATION FROM A DISK-SHAPED RECORDING MEDIUM THAT IS ROTATABLE AT A PLURALITY OF SPEEDS

BACKGROUND OF THE INVENTION

1. Field of the Invention

The present invention relates to a reproducing apparatus for a disk-shaped recording medium comprising on the surface thereof spiral or concentric recording tracks to which information is recorded by moving a recording and reproducing head radially to the recording surface of the disk while rotating the disk-shaped recording medium. More specifically, the invention relates to a rotational velocity control method for a disk-shaped recording medium drive apparatus whereby the rotational velocity of the disk-shaped recording medium is quickly adjusted to changes in the position of the recording and reproducing head, as well as the medium, apparatus, and operating environment, to achieve optimum performance.

2. Description of the Prior Art

In general, disk-shaped recording media are recording using a constant linear velocity (CLV) method in which the linear velocity of the signal recorded to and reproduced from the disk remains constant as a means of increasing the recording density. This means that in order to maintain a constant linear velocity in all recording areas of the disk-shaped recording medium. the medium must be driven at a high rotational speed when reading data from the inside circumference part of the medium where the reproduction radius is smallest, and driven at a slower rotational speed when reproducing data from the outside circumference part of the medium where the radius is obviously greater. Therefore, as the position from which the signal is reproduced moves between the inside and outside circumferences of the disk, the recording and reproducing head must be moved radially t the disk while simultaneously adjusting the rotational speed of the disk according to the current position of the recording and reproducing head so that the head moves at a constant linear velocity relative to the disk medium.

The structure of a conventional reproducing apparatus RAc for a disk-shaped recording medium is shown in FIG. 29. Information is recorded to spiral or concentric recording tracks formed on the surface of the disk-shaped recording medium 1 using a magnetic, physical, optical, or other method, including combinations of these. The disk-shaped recording medium 1 is placed on a turntable 2 and held in placed from above by a clamper 3. The turntable 2 is connected to the spindle 5 of a spindle motor 4, and is thus driven rotationally by the spindle motor 4.

The pickup 6 is driven by a traverse motor 7 along slider 8 in the radial direction of the disk-shaped recording medium 1, thereby scanning the recording tracks of the disk-shaped recording medium 1 to generate the reproduced recording signal Spu.

The servo controller 9 is connected to the output of the pickup 6, and thereby amplifies the reproduced recording signal Spu after being applied with a servo control process to output the amplified reproduction signal SPU. The servo controller 9 also generates a traverse tracking error signal Sts, which is used to drive the tracking actuator built in to the pickup 6, based on the tracking information contained in the reproduced recording signal Spu. The servo controller 9 thus controls any change in the traverse movement of the pickup 6 between the recording tracks based on the traverse tracking error signal Sts.

Also connected to the servo controller 9, the clock extractor 10 extracts the clock component from the reproduction signal SPU read from the disk-shaped recording medium 1, and thus outputs the clock signal Sck. Based on the extracted clock component, the clock extractor 10 also generates the data reproduction clock signal Spl.

A decoder 17 is also connected to the servo controller 9 and clock extractor 10. Based on the data reproduction clock signal Spl supplied from the clock extractor 10, the decoder 17 applies various operations to the reproduction signal SPU to reproduce the data recorded to the disk-shaped recording medium 1. The reproduced data is output as reproduction data Sd. The decoder 17 also extracts the subcode data contained in the reproduction signal SPU to generate and output the subcode information signal Sq.

Based on the subcode information signal Sq supplied from the decoder 17 to which it is connected, the reproduction mode controller 20P generates the traverse movement signal Stm. The traverse movement signal Stm specifies the amount of traverse movement the pickup 6 is driven, i.e., how far the pickup 6 moves radially to the disk-shaped recording medium 1.

Connected to the servo controller 9 and reproduction mode controller 20P, the traverse motor driver 19 generates the traverse motor drive signal Stv based on the traverse tracking error signal Sts and the traverse movement signal Stm. The traverse motor 7 then drives the pickup 6 in the traverse direction based on the traverse motor drive signal Stv received from the traverse motor driver 19.

The reference clock generator 11 outputs a reference clock signal Sr1 of a known frequency. This predefined reference clock signal Sr1 is input with the clock signal Sck extracted from the reproduced recording signal Spu to the CLV error detector 12. The CLV error detector 12 compares the phase and frequency of the two clock signals Sr1 and Sck, obtains the frequency difference between the clock and thus outputs the CLV error signal Sc1.

The spindle motor driver 18 is connected to the output of the CLV error detector 12, and thus generates the spindle motor drive signal Sm for driving the spindle motor 4 based on the CLV error signal Sc1. The spindle motor 4 is thus driven based on the spindle motor drive signal Sm supplied from the spindle motor driver 18, and the disk-shaped recording medium 1 is thus rotationally driven in a specific manner.

The reproducing apparatus RAc further comprises a main controller 24 for controlling the overall operation of the reproducing apparatus RAc. The main controller 24 also comprises an input means whereby the user can operate the reproducing apparatus RAc.

The operation of the reproducing apparatus RAc thus comprised during CLV reproduction is described below.

When data is being reproduced by the pickup 6 from the inside circumference part of the disk-shaped recording medium 1 during CLV operation, the spindle motor 4 rotates at a faster speed than when data is reproduced from the outside circumference part of the disk in order to obtain the same, constant data rate. The speed of the spindle motor 4 is adjusted based on the CLV error signal Sc1 output from the CLV error detector 12.

What happens as the reading area of the disk-shaped recording medium 1 moves from the inside circumference toward the outside circumference of the disk is described below.

In this example it is assumed that a selection recorded at the inside circumference part of a music CD is being reproduced, and the user then operates the reproducing apparatus RAc to interrupt reproduction and immediately begin reproducing a selection recorded at the outside circumference of the disc. This reproduction area movement command (selection command) input by the user using the input means of the main controller 24 is then transferred from the main controller 24 to the reproducing apparatus RAc.

The main controller 24 calculates the track address of the recording area corresponding to the selection made by the user, and inputs the calculated target track address to the reproduction mode controller 20P. Based on the subcode information signal Sq, the reproduction mode controller 20P then compares the current track address with the target track address to generate the traverse movement signal Stm. The traverse movement signal Stm specifies how far in the traverse direction the pickup 6 must travel to reach the target track address, and is supplied to the traverse motor driver 19.

The traverse motor driver 19 thus drives the traverse motor 7 to move the pickup 6 along the slider 8 from the inside circumference side to the outside circumference side of the disk-shaped recording medium 1, and thereby position the pickup 6 to the appropriate recording track. Once the pickup 6 is positioned to the correct recording track, the reproduced recording signal Spu is read from the disk-shaped recording medium 1, the servo controller 9 amplifies the reproduced recording signal Spu, and the clock signal Sck is extracted by the clock extractor 10.

The disk-shaped recording medium 1 is still spinning at high speed after the pickup 6 moves from the inside to the outside circumference, however, and the clock frequency of the extracted clock signal Sck thus increases roughly proportionally to the radial movement of the pickup 6. The clock frequency of the clock signal Sck is thus significantly greater than the clock frequency of the reference clock signal Sr1. It follows that the value of the CLV error signal Sc1, which corresponds to the difference between the clock signals Sck and Sr1, is high.

The spindle motor driver 18 therefore causes the spindle motor 4 to decelerate so that the value of the CLV error signal Sc1 decreases, ultimately to zero. When the value of the CLV error signal Sc1 is zero, the clock frequency of the clock signal Sck is equal to the clock frequency of the reference clock signal Sr1. This means that the data read rate of the pickup 6 at the current radial position of the disk-shaped recording medium 1 is equal to the reference clock signal Sr1 output from the reference clock generator 11.

What happens as the reading area of the disk-shaped recording medium 1 moves from the outside circumference toward the inside circumference of the disk is described below.

As described above, the pickup 6 is moved from the outside circumference toward the inside circumference based on the destination recording track address (target track address) input from the main controller 24 to the reproduction mode controller 20P. This means that, just as when the pickup 6 moved from the inside circumference to the outside circumference, the optimum linear velocity required for reading from the new recording track at the inside circumference cannot be obtained because the disk-shaped recording medium 1 is still spinning at the rotational speed required to obtain the constant linear velocity necessary for reproduction from an outside circumference track. The clock frequency of the clock signal Sck extracted from the reproduced recording signal Spu read by the pickup 6 from an inside circumference track of the disk-shaped recording medium 1 is thus significantly lower than the clock frequency of the reference clock signal Sr1 generated by the reference clock generator 11.

If the value of the CLV error signal Sc1 is defined as a positive value when the pickup 6 traverses the disk from inside to outside circumference, the CLV error signal Sc1 value is negative after outside to inside circumference travel, but the absolute value of these positive and negative values are substantially the same for equivalent traverse movement. It is therefore necessary, in this case, for the spindle motor driver 18 to drive the spindle motor 4 to accelerate so that the value of the CLV error signal Sc1 is again zero and the linear velocity of the pickup 6 at the inside circumference track converges to the defined linear velocity of the disk-shaped recording medium 1 as obtained from the reference clock signal Sr1.

The data read rate is equivalent to the linear velocity of the pickup 6 relative to the recording track of the disk-shaped recording medium 1. CLV control is therefore used to maintain a constant data rate as the pickup 6 moves between the inside and outside circumference areas of the disk-shaped recording medium 1 irrespective of the current radial position of the pickup 6 on the disk-shaped recording medium 1. As a result, the clock extractor 10, reference clock generator 11, and CLV error detector 12 of the reproducing apparatus RAc described above can be thought of as a CLV controller 21 accomplishing the constant linear velocity drive control used by the reproducing apparatus RAc.

FIG. 30 is a graph of the relationship between the rotational speed of the disk-shaped recording medium 1 and the radial position of the pickup 6 on the disk-shaped recording medium 1 during CLV control. The radial position R is shown on the axis of abscissae, and the rotational speed N of the disk-shaped recording medium 1 is shown on the axis of ordinates. The values Rmin and Rmax indicate the radial positions at the first recording track on the inside circumference side and the last recording track on the outside circumference side of the disk-shaped recording medium 1.

Note that because information is recorded to this disk-shaped recording medium 1 at a constant linear velocity, the rotational speed N of the disk-shaped recording medium 1 changes in inverse proportion to the position R of the pickup 6 when reading data. The relationship between rotational speed N and position R can be expressed by the equation N ½πR.

With this type of reproducing apparatus for a disk-shaped recording medium, it is necessary to rapidly access and reproduce data from any specified part of the recording surface in response to user requests. The two major methods described below can be used to achieve this.

One is to move the pickup to a particular position after a read command from the user is received, wait for the rotational speed of the disk to stabilize after the pickup moves to the corresponding disk position, and then begin actual data reading from the target track. This method minimizes the access time. The other method is to maximize the target track scanning speed by the pickup, which determines the data read rate per unit time.

Access time in a conventional CLV-controlled reproducing apparatus for a disk-shaped recording medium is determined by the time required to increase or decrease the speed of the spindle motor 4 to achieve the constant linear velocity specified for the disk-shaped recording medium 1 when the pickup 6 moves from the inside to outside circumference or from the outside to inside circumference. In practice, it is therefore necessary to change the speed of the rotational drive train comprising the rotating disk-shaped recording medium 1, turntable 2, clamper 3, spindle motor 4, and other components suddenly and stably, using a braking force proportional to the rotating mass and the square of the rotational speed.

Because this rotational drive train is also spinning at high speed, the change in the rotational speed according to the access position also increases when the rotational speed of the media increases. For example, a CD-ROM operating in the 1× mode spins at approximately 500 rpm when reproducing data from an inside circumference track, and at approximately 200 rpm when reproducing data from an outside circumference track. The difference is approximately 300 rpm or approximately 2.5 times between inside and outside circumference tracks. However, when a CD-ROM is driven in the 4× mode, the disc spins at approximately 2000 rpm at the inside circumference track, and at approximately 800 rpm at the outside circumference track, a difference of approximately 1200 rpm.

As this speed difference increases, the spindle motor torque required to adjust the disk speed in a given unit of time increases. This means that if the spindle motor torque is low, the access time, i.e., the time required for the rotational speed of the disk to stabilize at the required constant linear velocity, increases. High torque spindle motors are therefore required to maximize access time as the spindle speed increases. This leads to unavoidable increases in power consumption and cost as the motor size contributing to the reproducing apparatus it self increases to provide the necessary torque.

The scanning speed of the pickup also cannot be simply determined because the data read rate changes in proportion to the scanning speed of the pickup. Specifically, the maximum scanning speed must be set so that the data read rate is less than the maximum processing speed of the signal processing circuitry of the reproducing apparatus, or the maximum rotational speed of the rotational drive train. In practice, however, the maximum scanning speed must be set to a lower rate in order to provide a tolerance range to compensate for variations in the quality of the disk-shaped recording medium, the rotational drive train components, and the signal processing circuitry, changes in operating characteristics over time due to heat from operation, and even simple deterioration from extended use. If this tolerance range is insufficient, the drive apparatus for the disk-shaped recording medium may malfunction during operation. If the tolerance range is too great, the specified characteristics and performance of the disk-shaped recording medium will be wasted.

Therefore, the object of the present invention is to provide a drive apparatus for a disk-shaped recording medium whereby any desired part of the recording surface of the disk-shaped recording medium can be rapidly accessed, data can be read at high speed, and optimum performance can be achieved according to the condition of the medium, apparatus, and operating environment.

SUMMARY OF THE INVENTION

The object of the present invention is therefore to provide a reproducing apparatus for a disk-shaped recording medium. A reproducing apparatus for reading information from the recording track of a disk-shaped recording medium while rotationally driving the disk-shaped recording medium at a particular speed, where the recording track is disposed extended circumferentially to the center of the recording surface and information is recorded to the recording tracks at a constant linear velocity, comprises a pickup means for scanning the recording track and generating a first reproduction signal; a first rotational drive control means for rotating the disk-shaped recording medium at a constant linear velocity based on the reproduction signal; a second rotational drive control means for rotating the disk-shaped recording medium at a constant angular velocity; and a rotational drive control means selection means for selecting the first rotational drive control means or the second rotational drive control means based on the position of the pickup means.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
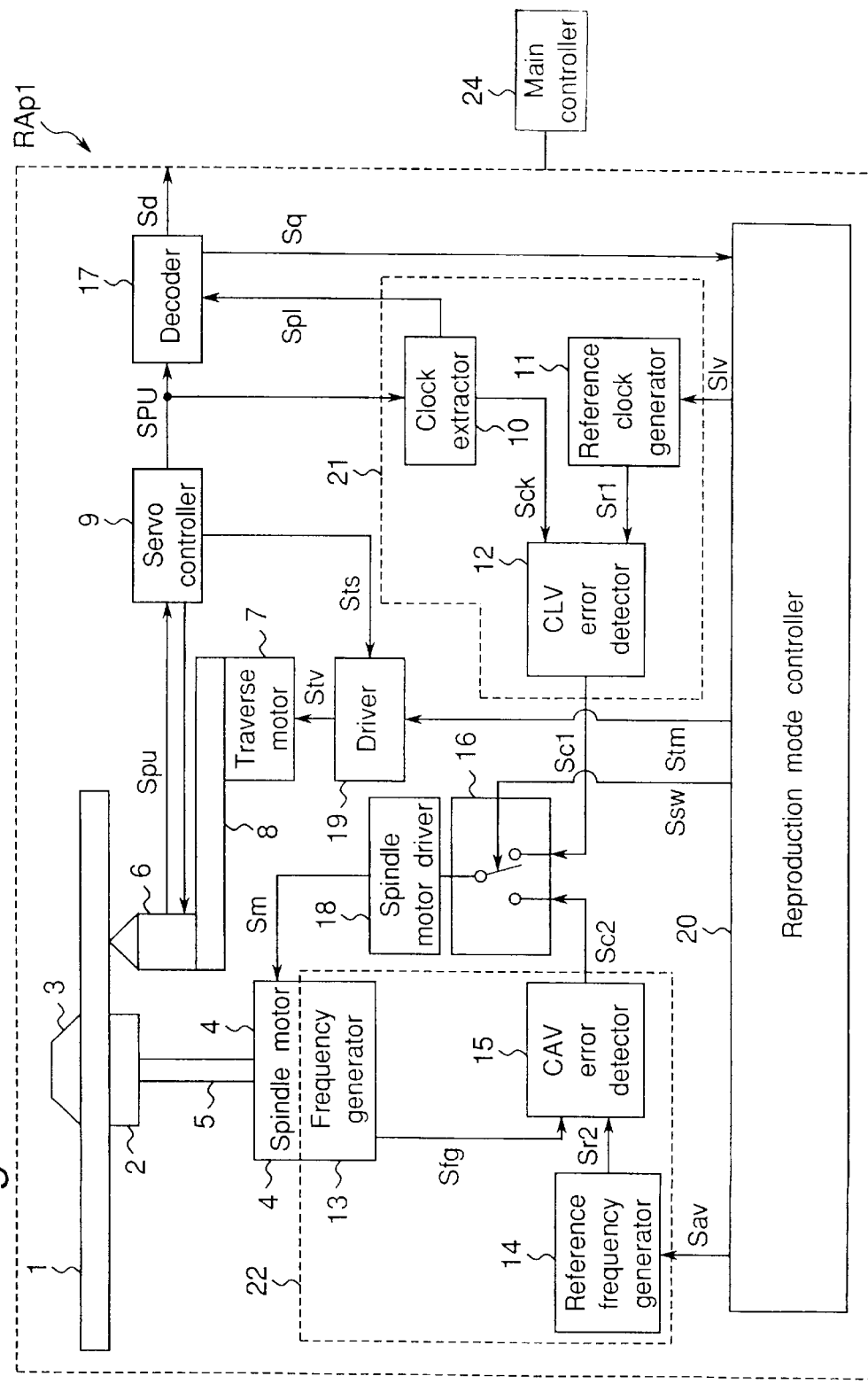
FIG. 1 is a block diagram of a disk-shaped recording medium reproducing apparatus according to a preferred embodiment of the invention.

The preferred embodiments of the present invention are described below with reference to the accompanying FIGS. 1 to 30. Note that like parts in the figures relating to the present invention and FIG. 29 used above to describe the related technology are identified by the same reference numbers, and further detailed description thereof is omitted below.

The hardware configuration of a recording and reproduction apparatus for a disk-shaped recording medium according to the first embodiment of the invention is described first below with reference to FIG. 1. Note that, similarly to the reproducing apparatus RAc shown in FIG. 29 according to the prior art, the reproducing apparatus RAp1 according to this first embodiment comprises a disk-shaped recording medium 1, turntable 2, clamper 3, spindle motor 4, spindle 5, pickup 6, traverse motor 7, slider 8, servo controller 9, clock extractor 10, reference clock generator 11, CLV error detector 12, decoder 17, spindle motor driver 18, traverse motor driver 19, reproduction mode controller 20, and main controller 24. In the reproducing apparatus RAp1 of the invention, however, the reference clock generator 11 is connected to the reproduction mode controller 20, and receives therefrom a CLV setting signal Slv.

The CLV setting signal Slv is generated by the reproduction mode controller 20 based on the subcode information signal Sq, and expresses a particular constant linear velocity for the current position of the pickup 6. Note that there are various limits to the processing capacity of the decoder 17 imposed by, for example, the operating clock. Therefore, if the maximum data rate at which the decoder 17 can process the reproduction signal SPU is maximum data rate Vm, then the equivalent linear velocity of the disk-shaped recording medium 1 at which this maximum data rate Vm is achieved can be expressed as maximum linear velocity Lvm.

The reproducing apparatus RAp1 of the invention further comprises a constant angular velocity (CAV) controller 22 and selector switch 16.

The CAV controller 22 comprises a frequency generator 13, reference frequency generator 14, and CAV error detector 15. The frequency generator 13 is connected to the spindle motor 4, and generates spindle speed signal Sfg. The spindle speed signal Sfg contains a frequency component proportional to the rotational speed of the spindle 5.

The reference frequency generator 14 generates reference frequency signal Sr2 based on a CAV setting signal Sav supplied from the reproduction mode controller 20. The CAV setting signal Sav is generated by the reproduction mode controller 20 based on the subcode information signal Sq, and expresses a particular constant angular velocity for the current position of the pickup 6.

The CAV error detector 15 generates a CAV error signal Sc2 based on the spindle speed signal Sfg from the frequency generator 13, and the reference frequency signal Sr2 from the reference frequency generator 14. The CAV error detector 15 supplies this CAV error signal Sc2 as the output of the CAV controller 22 to one side of a selector switch 16.

The selector switch 16 is connected to the outputs of the CLV error detector 12 and the CAV error detector 15, and receives respectively therefrom the CLV error signal Sc1 and the CAV error signal Sc2. The selector switch 16 operates according to a drive control selection signal Ssw supplied from the reproduction mode controller 20 to select and pass to the spindle motor driver 18 either the CLV error signal Sc1 and the CAV error signal Sc2.

Note that in this exemplary embodiment of the invention the reference clock generator 11 and reference frequency generator 14 output the frequency signals defined by the CLV setting signal Slv and CAV setting signal Sav supplied from the reproduction mode controller 20. The generators 11 and 14, however, may alternatively simply output particular frequency signals predefined in the respective generators.

Note, further, that the drive control selection signal Ssw in this embodiment is a binary signal that is set to either 0 to select the output (CLV error signal Sc1) from the CLV controller 21, or 1 to select the output (CAV error signal Sc2) from the CAV controller 22.

By thus providing a CAV controller 22 it is not necessary to control the speed of the disk-shaped recording medium 1 according to the position of the pickup 6 even when reproducing a disk-shaped recording medium 1 recorded with CLV control if CAV control is used for reproduction from the inside circumference tracks. This is because CAV control can be used effectively to shorten the access time. Mechanical and other limitations of the spindle motor, however, impose an upper limit on the rotational speed tolerance. When this limit on the rotational speed is raised, however, the processing speed of the signal processing circuit imposes a limit on the data rate.

It is therefore necessary to balance these limitations in order to optimize reproduction performance. A method for accomplishing this is described below according to the present invention.

Embodiment 1

Figure 30:
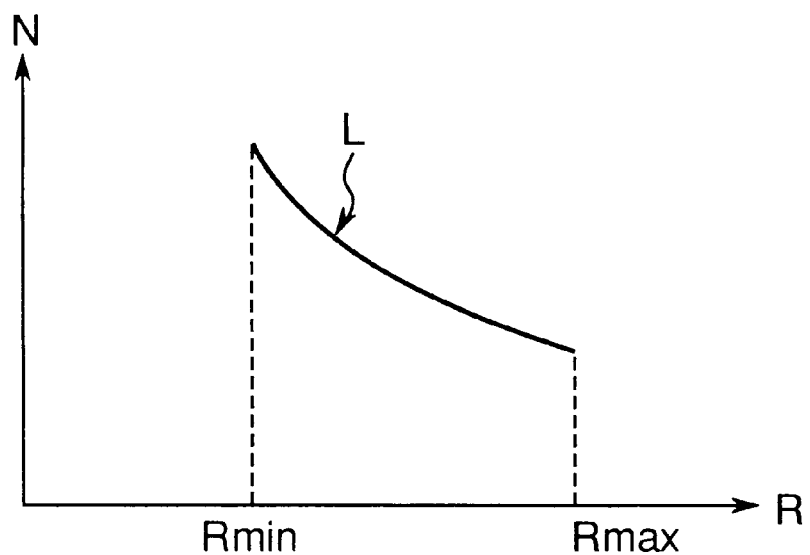
FIG. 30 is a graph used to describe CLV control in the conventional disk-shaped recording medium reproducing apparatus shown in FIG. 29.

The operation of a first embodiment of the reproducing apparatus RAp1 based on the configuration shown in FIG. 1 is described below with reference to FIG. 2. As shown in FIG. 30 in the discussion of the relation technology above, the radial position R of the pickup 6 on the disk-shaped recording medium 1 during reproduction is shown on the axis of abscissae, and the rotational speed N of the disk-shaped recording medium 1 is shown on the axis of ordinates. The change in the rotational speed of the disk-shaped recording medium 1 according to the present invention is shown by the solid line L1. The change in the rotational speed of the disk-shaped recording medium 1 by means of the reproducing apparatus RAc according to the prior art is shown by dotted line L.

The recording area of the disk-shaped recording medium 1 is divided into two parts in the present embodiment of the invention bounding on a particular radial position R1 at a known position between the Rmin track on the inside circumference side and the and Rmax track on the outside circumference side of the disk-shaped recording medium 1. CLV area Aclv from Rmin to R1 is located on the inside circumference part of the disk, and CAV area Acav from R1 to Rmax is located on the outside circumference part of the disk.

Note that the dotted line L overlaps the solid line L1 in the CLV area Aclv. It is therefore possible to control reproduction referenced to this particular radial position R1 as described below.

CLV control is used for reproduction from inside circumference (IC) track Rmin to particular radial position R1 toward the outside circumference of the disk. This is accomplished by the reproduction mode controller 20 of the reproducing apparatus RAp1 supplying a drive control selection signal Ssw to the selector switch 16 causing the selector switch 16 to supply the CLV error signal Sc1 from the CLV controller 21 to the spindle motor driver 18 while in the CLV area Aclv.

CAV control is then used for reproduction from particular radial position R1 out to outside circumferential track Rmax on the outside circumference of the disk. This is accomplished by the reproduction mode controller 20 changing the drive control selection signal Ssw supplied to the selector switch 16 at particular radial position R1 so that the selector switch 16 passes the CAV error signal Sc2 to the spindle motor driver 18 through the CAV area Acav.

The particular radial position R1 thus represents a control transition between CLV and CAV control. It is therefore possible to minimize the access time at any position on the disk as the pickup 6 traverses through and between the CLV area Aclv and CAV area Acav by switching the selector switch 16 at the particular radial position R1 to pass the appropriate CLV error signal Sc1 or CAV error signal Sc2.

Figure 2:
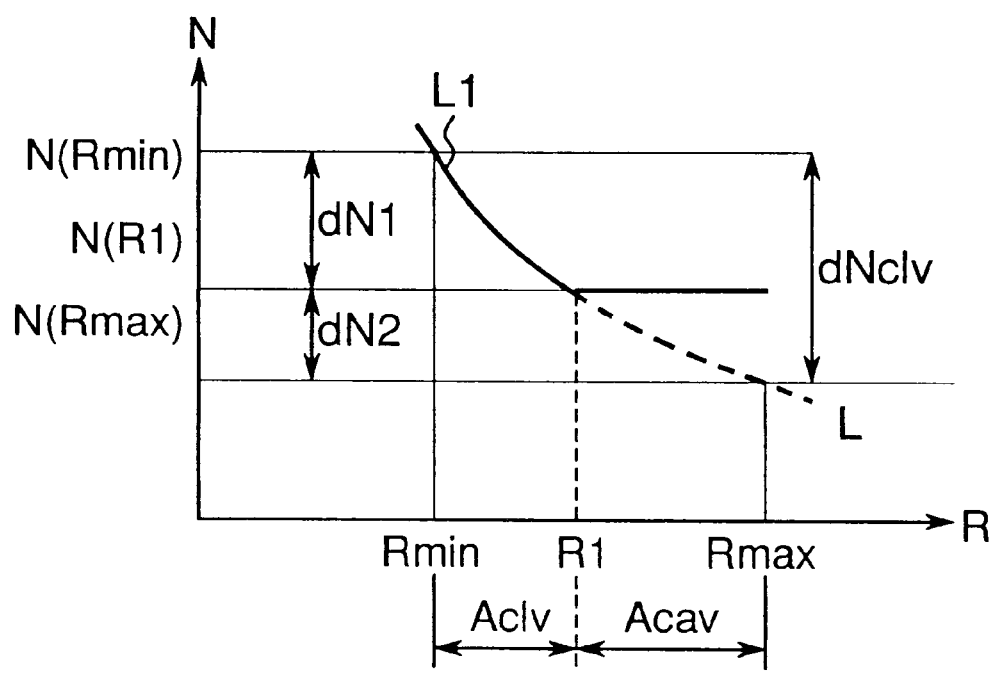
FIG. 2 is a graph used to describe the combination of CLV control and CAV control in a reproducing apparatus according to the first embodiment shown in FIG. 1.

Referring to FIG. 2, the maximum rotational speed during conventional CLV control at radial positions Rmin, R1, and Rmax are defined below as N(Rmin), N(R1), and N(Rmax), respectively. The change in the rotational speed in the CLV area Aclv of the disk in the present embodiment of the invention is when the pickup 6 travels from inside circumferential track Rmin to radial position R1. The rotational speed N in the CAV area Acav is constant at N(R1) irrespective of the position of the pickup 6.

The maximum change in rotational speed dN1 at any point in the recording area of a disk-shaped recording medium 1 according to the present invention can therefore be calculated in the present embodiment using equation (1).

$$dN1 = N(Rmin) - N(R1) \tag{1}$$

CLV control is used throughout the recording area of a disk-shaped recording medium 1 in a conventional recording and reproducing apparatus, however. The maximum change in rotational speed dNclv in this case is when the pickup 6 traverses from the inside circumferential track Rmin to the outside circumferential track Rmax, and can be calculated using equation (2).

$$dNclv = N(Rmin) - N(Rmax) \tag{2}$$

Note that the maximum change in rotational speed dN2 in the CAV area Acav when CLV control is used can also be calculated using the conventional equation for CLV control. With a disk-shaped recording medium 1 and control method according to the present embodiment, the value for dN2 is obtained from equation (3).

$$dN2 = dNclv - dN1 = N(R1) - N(Rmax) \tag{3}$$

By thus dividing the recording area of the disk-shaped recording medium 1 into two parts and selectively using both CLV control and CAV control, the maximum change in rotational speed dN1 can be reduced by N(R1)−N(Rmax).

Signals recorded to the disk-shaped recording medium 1 can also be reproduced immediately after the pickup 6 is moved radially to the disk-shaped recording medium 1 in the CAV area Acav because the speed of the spindle motor 4 does not change in the CAV area Acav.

Furthermore, the change in the rotational speed can be reduced when the pickup 6 moves between the CAV area Acav and CLV area Aclv compared with when the disk-shaped recording medium 1 is driven at a constant linear velocity throughout the recording area. The time required to effect a change in disk speed, and therefore the access time, can therefore be reduced, and information can be quickly reproduced from a new location on the disk-shaped recording medium 1.

Figure 3:
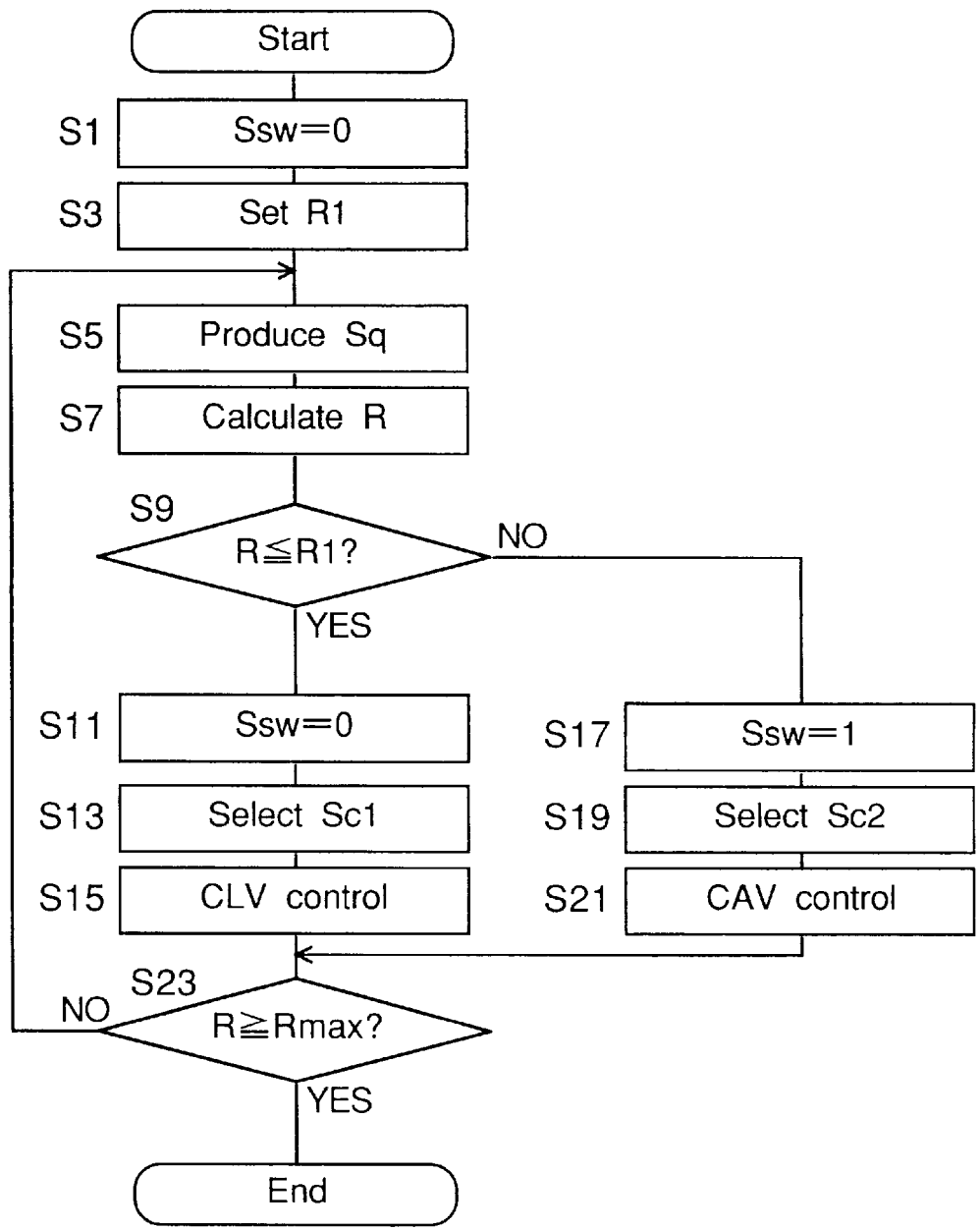
FIG. 3 is a flow chart used to describe the operation of the reproducing apparatus according to the first embodiment shown in FIG. 1 using the combination of CLV control and CAV control shown in FIG. 2.

The operation of the reproducing apparatus RAp1 according to this first embodiment is described next with reference to the flow chart shown in FIG. 3. In this exemplary operation described below the pickup 6 starts reading from a position near the inside circumferential track Rmin.

The drive control selection signal Ssw is therefore set to 0 (step S1), and the selector switch 16 passes the CLV error signal Sc1 to the spindle motor driver 18. Reproduction therefore starts at a known initial rotational speed N(Rmin) using CLV control.

The TOC information is then read (step S3), and the control transition point R1 is set based on the reproduced TOC information and a predefined recording area division method.

The decoder 17 then produces the subcode information signal Sq based on the reproduction signal SPU from the disk-shaped recording medium 1 (step S5).

The reproduction mode controller 20 then calculates the current radial position R of the pickup 6 based on the subcode information signal Sq (step S7).

It is then determined whether the current radial position R of the pickup 6 is on the inside circumference side of the control transition point R1 (step S9). If YES, control passes to step S11.

The drive control selection signal Ssw is then set again to 0 at step S11 before advancing to S13.

The selector switch 16 again selects and passes the CLV error signal Sc1 from the CLV controller 21 (step S13) because the drive control selection signal Ssw is again 0.

The CLV error signal Sc1 is therefore input to the spindle motor driver 18 to continue CLV control from step S15. Control then advances to S23.

At step S23 it is determined whether the current radial position R of the pickup 6 has reached the outside circumferential track Rmax. If YES, reproduction processing stops because reproduction of the entire recording area of the disk-shaped recording medium 1 has been completed.

If NO, the procedure loops back to step S5. Steps S11, S13, S15, S5, S7, and S9 are thereafter repeated until NO is returned at step S9.

If a NO is returned at step S9, the pickup 6 is positioned on the outside circumference side of the control transition point R1. Control therefore branches to step S17. Thus described operation which terminating at the time when the recording area has been accessed from the inside circumference to the outside circumference thereof is suitable for a disk-shaped recording medium wherein the information is sequentially recorded, such as a music CD. However, it is also possible to determine the operation at the time when any specific portion of the recording area has been accessed for the other CD than the sequentially recorded disc as well as a randomly recorded disc.

The drive control selection signal Ssw is set to 1 at S17. Control then advances to S19.

Because the drive control selection signal Ssw is 1, the selector switch 16 passes the CAV error signal Sc2 from the CAV controller 22 to the spindle motor driver 18.

The CAV error signal Sc2 then causes the spindle motor driver 18 to implement CAV control (step S21). Control then advances to S23 where it is again determined whether the current radial position R of the pickup 6 has reached the outside circumferential track Rmax.

It is therefore possible to switch the control method according to the recording area being reproduced immediately and without delay according to the current radial position R of the pickup 6. Furthermore, it is possible to switch the control method whether the disk-shaped recording medium 1 is reproduced by the reproducing apparatus RAp1 sequentially from the inside circumference side to the outside circumference side of the disk, or whether the reproduction area is changed suddenly from a track on the outside circumference side of the control transition point R1 to a track on the inside circumference side of the control transition point R1.

More specifically, the reproducing apparatus of the invention treats the outside circumference area of the disk-shaped recording medium 1 recorded with CLV control as a CAV area in which constant angular velocity control is used to control reproduction, treats the inside circumference area of the disk 1 as a CLV area in which constant linear velocity control is used, and changes the control method according to the recording area. This contrasts with conventional apparatuses in which CLV control is used throughout the recording area of the disk-shaped recording medium 1.

The reproducing apparatus RAp1 of the invention can therefore immediately resume reproducing the recorded signal as soon as the pickup is moved. The reproducing apparatus RAp1 also requires less time to change the rotational speed of the disk-shaped recording medium 1 when the pickup moves between the CAV area and CLV area, thus reducing the access time and enabling data to be accessed more quickly.

Embodiment 2

A second embodiment of the reproducing apparatus RAp1 shown in FIG. 1 is described next below with reference to FIGS. 4 and 5.

A disk-shaped recording medium 1 is, in general, sequentially recorded from the inside circumference side of the disk. This means that when the amount of recorded information is small, only the inside circumference area of the disk-shaped recording medium 1 is used. The present embodiment therefore relates to a method of optimizing reproduction of the inside circumference area of the disk-shaped recording medium 1.

Figure 4:
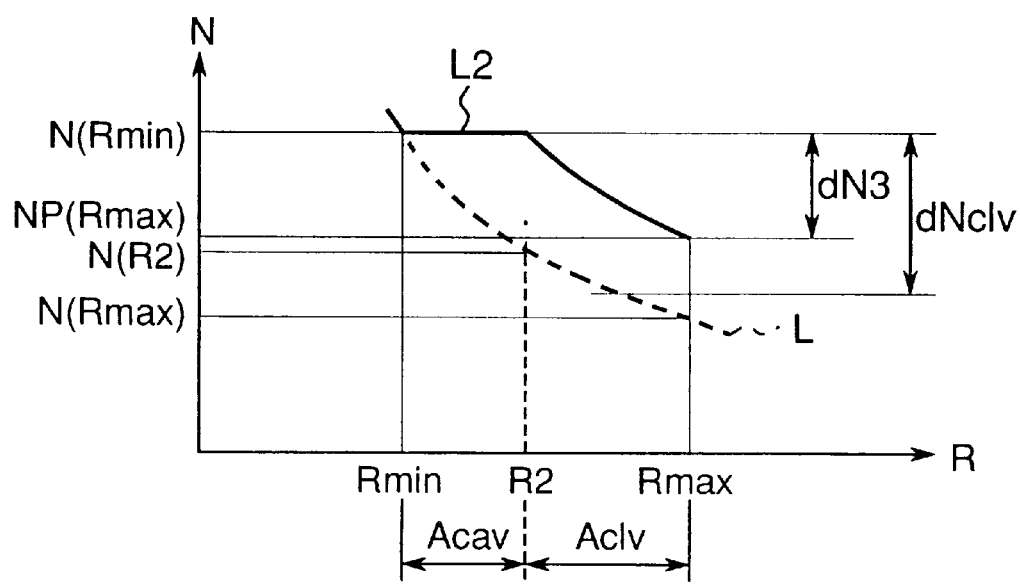
FIG. 4 is a graph used to describe the combination of CLV control and CAV control in a reproducing apparatus according to a second embodiment of the invention.

The operation of the reproducing apparatus RAp1 in the present embodiment is described first briefly with reference to FIG. 4. As in the first embodiment shown in FIG. 2, the change in the rotational speed of the disk-shaped recording medium 1 according to the present embodiment is shown by the solid line L2. The change in the rotational speed of the disk-shaped recording medium 1 by means of the reproducing apparatus RAc according to the prior art is shown by dotted line L.

The maximum rotational velocity during conventional CLV control at radial positions Rmin, R2, and Rmax are defined below as N(Rmin), N(R2), and N(Rmax), respectively.

The recording area of the disk 1 is divided into two parts in the present embodiment of the invention bounding on a particular radial position R2 at a known position between the Rmin track on the inside circumference side and the and Rmax track on the outside circumference side of the disk-shaped recording medium 1. In this embodiment, however, the CAV area Acav from Rmin to R2 is located on the inside circumference part of the disk, and the CLV area Aclv is located on the outside circumference part of the disk from R2 to Rmax.

The disk 1 thus divided is reproduced referenced to this particular radial position R2 as described below.

The rotational speed N in the CAV area Acav from Rmin to control transition point R2 is constant at N(Rmin) irrespective of the position of the pickup 6. The CLV area Aclv from control transition point R2 to outside circumferential track Rmax is reproduced with CLV control similarly to the CLV control used by the conventional apparatus and indicated by the dotted line L.

More specifically, the solid line L2 showing the change in disk speed in the CLV area Aclv has the k times as the dotted line L, where k is greater than 1, but the disk speed at which CLV control begins is N(Rmin) and not N(R2). this means that the disk speed along the curvature of line L2 in the CLV area Aclv of the disk 1 is greater than the disk speed along dotted line L by N(Rmin)−N(R2). The disk speed NP(Rmax) at the outside circumferential track Rmax in the present embodiment of the invention as shown by solid line L2 can be calculated from equation (4).

$$NP(Rmax) = k \cdot N(Rmax) \qquad (4),$$

wherein k=R2/Rmin.

The maximum change in rotational speed dN3 in the present embodiment is obtained from equation (5).

$$dN3 = N(Rmin) - NP(Rmax)$$
$$= N(Rmin) - R2 \cdot N(Rmax)/Rmin$$
$$= N(R2) - R2 \cdot N(Rmax)/Rmin \qquad (5)$$

The maximum change in rotational speed dNclv of a conventional reproducing apparatus RAc is shown in equation (6).

$$dNclv = N(Rmin) - N(Rmax) \qquad (6)$$

The difference dN between the maximum change in rotational speed dN3 of the present embodiment and the maximum change in rotational speed dNclv of the conventional apparatus is calculated by equation (7). Note that difference dN can also be reduced by the present embodiment compared with the prior art.

$$dN = dNclv - dN3$$
$$= N(Rmin) - N(Rmax) - \{N(Rmin) - R2 \cdot N(Rmax)/Rmin\}$$
$$= (R2/Rmin - 1) \cdot N(Rmax) \qquad (7)$$

Apparent form the equation (7), R2/Rmin is greater than 1, dN essentially has a positive value. The operation of the reproducing apparatus RAp1 in the present embodiment differs from that of the first embodiment only in the control method applied at the inside and outside circumference areas, respectively, and is therefore substantially identical to the operation described above with reference to FIGS. 2 and 3. Referring to the flow chart in FIG. 5, the differences in operation are described briefly below.

Because the CAV area Acav is on the inside circumference side of the disk, CAV control is used when the pickup 6 starts reading from the disk-shaped recording medium 1 at inside circumferential track Rmin. The drive control selection signal Ssw is therefore set to 1 at step S51. The selector switch 16 thus passes the CAV error signal Sc2 to the spindle motor driver 18 to start CAV control.

At S53, the control transition point R2 is set to a particular address.

Whether the current radial position R of the pickup 6 is on the inside circumference side of the control transition point R2 (step S59) is then determined based on the current radial position R of the pickup 6 calculated from on the subcode information signal Sq (S55 and S57).

If YES, the drive control selection signal Ssw is set again to 1 (step S61). The selector switch 16 again selects and passes the CAV error signal Sc2 (step S63), and CAV control continues (step S65). If reproduction has not finished in step S73, the procedure loops back to step S55.

However, if NO is returned at step S59, the pickup 6 is positioned on the outside circumference side of the control transition point R2. Control therefore branches to step S67. The drive control selection signal Ssw is therefore set to 0, and the CLV error signal Sc1 is selected (step S69). CLV control is therefore applied from step S71, after which control advances to S73.

It is therefore possible to switch the control method according to the recording area being reproduced immediately and without delay according to the current radial position R of the pickup 6. Furthermore, it is possible to switch the control method whether the disk-shaped recording medium 1 is reproduced by the reproducing apparatus RAp1 sequentially from the inside circumference side to the outside circumference side of the disk, or whether the reproduction area is changed suddenly from a track on the outside circumference side of the control transition point R2 to a track on the inside circumference side of the control transition point R2.

It is sufficient to set the particular linear velocity to a rate whereby the data rate of the signal read by the pickup 6 matches the processing rate of the decoder 17. In this case the reproduction signal SPU read by the pickup 6 is processed by the decoder 17 after the disk-shaped recording medium 1 reaches the particular linear velocity. The change in the rotational speed of the disk-shaped recording medium can therefore be reduced relative to the change in the rotational speed when the entire disk is reproduced using CLV control, and data can be read from the disk-shaped recording medium quickly.

The reproducing apparatus RAp1 according to the present embodiment can thus use CAV control to reproduce any recording area on the inside circumference side of a freely definable reproduction position instead of using CLV control throughout the entire recording area in the manner of an apparatus according to the prior art. It is therefore possible to immediately resume reproducing the recorded signal as soon as the pickup is moved inside this CAV control area. Furthermore, when the pickup 6 moves to the CLV control area on the outside circumference side of this CAV control area, the change in disk speed required to resume reproduction can be reduced. The access time is therefore reduced, and data can be accessed more quickly.

Embodiment 3

The third embodiment of the present invention is described next below with reference to FIGS. 6 to 8. It should be noted that this embodiment is an improvement of the reproducing apparatus according to the first embodiment shown in FIGS. 2 and 3.

In the first embodiment above the CAV area Acav on the outside circumference side of control transition point R1 is reproduced using CAV control in which the disk is driven at a constant angular velocity N(R1). The linear velocity therefore increases proportionally to $2\pi R \cdot N(R1)$. The data rate of the CAV area Acav also increases as the rotational speed N(R1) increases, and is greatest at the outside circumferential track Rmax. Furthermore, the linear velocity of the reproduction signal rises sharply, particularly in the CAV area Acav, as the rotational speed of the disk-shaped recording medium 1 increases; the signal frequency therefore rises, and in certain cases can surpass the maximum data rate Vm, which represents the maximum processing rate, of the decoder 17.

In other words, when the rotational speed N(R1) at the control transition point R1 is high, the data rate of the reproduction signal SPU (Spu) surpasses the maximum data rate Vm of the decoder 17 before the pickup 6 traverses to the outside circumferential track Rmax of the disk-shaped recording medium 1. When this happens, the recording area from the control transition point R1 to the outside circumferential track Rmax cannot be completely reproduced. Furthermore, if the rotational speed N(R1) at the control transition point R1 is too low, the data rate of the reproduction signal SPU is still significantly less than the maximum data rate Vm corresponding to the maximum linear velocity Lvm of the decoder 17 at the outside circumferential track Rmax. When this happens, maximum performance cannot be derived from the reproducing apparatus RAp1.

It is therefore preferable to set the rotational speed N(R1) at the control transition point R1 so that the data rate of the reproduction signal SPU is marginally less than the maximum linear velocity Lvm at the outside circumferential track Rmax.

This is accomplished in the reproducing apparatus RAp1 of the present embodiment by calculating the maximum allowable rotational speed Nmax(Rmax) at which the data rate of the reproduced recording signal Spu equals the maximum linear velocity Lvm of the decoder 17 at the outside circumferential track Rmax of the disk-shaped recording medium 1.

This maximum allowable rotational speed Nmax(Rmax) is then used as the maximum value for setting the rotational speed N(R1) of the disk-shaped recording medium 1 at the control transition point R1. By thus determining the rotational speed N(R1), the data rate of the reproduction signal SPU can be kept less than or equal to the maximum data rate Vm. The performance of the reproducing apparatus RAp1 can therefore be optimized while reproducing the entire recording area of the disk-shaped recording medium 1. Furthermore, it is also possible to determine the control transition point R1 based on the maximum allowable rotational speed Nmax.

The method of setting the rotational speed N(R1) at the control transition point R1 of the disk 1 to the maximum allowable rotational speed Nmax(Rmax) by means of the present embodiment is described below with reference to FIG. 6.

The maximum allowable rotational speed Nmax(Rmax), i.e., the maximum rotational speed N(Rmax) at the outside circumferential track Rmax, of the reproducing apparatus RAp1 during CLV control can be calculated from the inside circumferential track Rmin, outside circumferential track Rmax, and maximum linear velocity Lvm of the decoder 17 using the following equation (8).

$$Nmax(Rmax) = Lvm/2\pi \cdot Rmax \qquad (8).$$

The radial position R3 at which the maximum allowable rotational speed Nmax(Rmax) is reached when CAV control is used to reproduce the entire recording area of the disk-shaped recording medium 1 is then calculated. The rotational speed N(R3) at this radial position R3 is expressed by the following equation (9).

$$N(R3) = C/2\pi \cdot R3$$
$$= Nmax(Rmax)$$
$$= Lvm/2\pi \cdot Rmax \qquad (9),$$

wherein C is a constance.

The radial position R3 at which the maximum allowable rotational speed Nmax(Rmax) is reached when CAV control is used to reproduce the recording area of the disk-shaped recording medium 1 is then calculated. This radial position R3 is calculated from equation (9).

$$R3 = F(Nmax(Rmax))$$
$$= C \cdot Rmax/Lvm \qquad (10)$$

This CLV limit position R3 is then defined as the control transition point R1 of the first embodiment above to enable CAV-controlled reproduction of the CAV area Acav from control transition point R3 (CLV limit position R3) to outside circumferential track Rmax without causing the decoder 17 to overflow.

Figure 6:
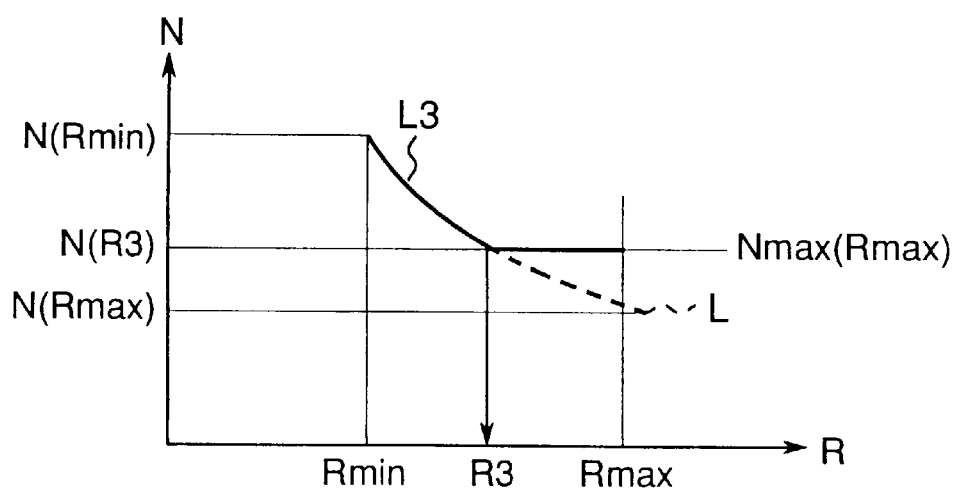
FIG. 6 is a graph used to describe the combination of CLV control and CAV control in a reproducing apparatus according to a third embodiment of the invention.

The relationship between the radial position R and the rotational speed N in the present embodiment of the invention is shown by solid line L3 in FIG. 6. Note that this relationship in a reproducing apparatus according to the prior art is shown by the dotted line L.

Figure 7:
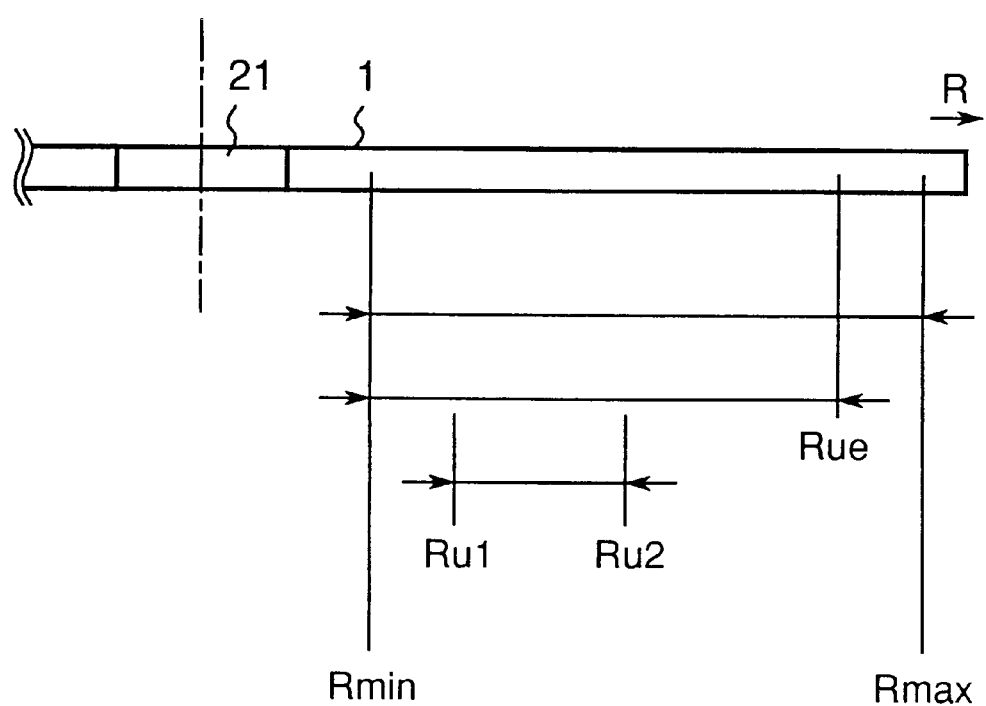
FIG. 7 is used to describe the recording area of a disk-shaped recording medium.
Figure 8:
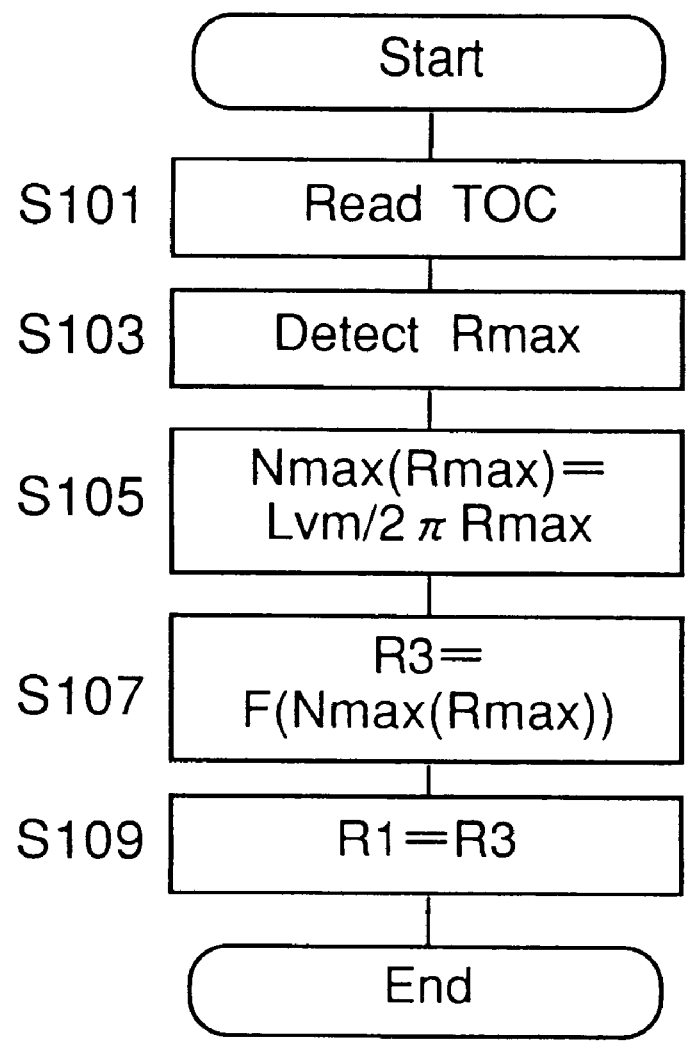
FIG. 8 is a flow chart used to describe the operation of the reproducing apparatus according to the third embodiment using the combination of CLV control and CAV control shown in FIG. 6.

The positions of inside circumferential track Rmin and outside circumferential track Rmax relative to a radial cross section of a disk-shaped recording medium 1 are shown in FIG. 7. The maximum recording area, i.e., the largest area of the disk 1 that can be recorded by the recording system, is disposed between inside circumferential track Rmin and outside circumferential track Rmax. Control information used by the system is recorded from the inside circumferential track Rmin toward the outside circumference of the disk. The control information is followed by user data recording from the end of the control information toward the outside circumferential track Rmax to a user data end position Rue. It will be obvious that when user data is recorded to the full capacity of the recording area, the user data end position Rue will match the outside circumferential track Rmax.

The TOC information, which records what information is recorded where on the disk, is recorded from the inside circumferential track Rmin when the disk-shaped recording medium 1 is a CD-ROM. The reproduction mode controller 20 can then know the address of the user data end position Rue from the TOC information contained in the subcode information signal Sq. What happens when data recorded from radial position Ru1 to radial position Ru2 is accessed and reproduced is described next below. Note that both Ru1 and Ru2 are located between inside circumferential track Rmin and the user data end position Rue in the recording area of a disk-shaped recording medium 1 recorded as described above.

It should be noted that some sort of table of contents recording the addresses of inside circumferential track Rmin, outside circumferential track Rmax, and other control data is typically recorded to a particular radial position of the disk, which may vary according to the specific type of disk-shaped recording medium 1. The location of this information can therefore always be known once the type of disk-shaped recording medium 1 is determined. The user can alternatively input the required information to the reproduction mode controller 20 via the main controller 24. While the location of such standardized data is predetermined and therefore relatively easily knowable and enterable by the user, address information such as the user data end position Rue can vary from disk to disk, and is therefore not easily knowable. Reading the TOC information is therefore preferable because information unique to the actual recorded content can then be known.

The operation of a reproducing apparatus RAp1 according to the present embodiment of the invention is described next below with reference to the flow chart in FIG. 8. Note that step S3 in the flow chart shown in FIG. 3 is replaced by steps S101, S103, S105, S107 and S109 in FIG. 8.

In this exemplary operation described below the drive control selection signal Ssw is set to 0 (step S1), and the TOC information is then read (step S101).

The address of outside circumferential track Rmax is then obtained (step S103).

The maximum allowable rotational speed Nmax(Rmax) is then calculated based on the maximum linear velocity Lvm and outside circumferential track Rmax (step S105).

Next, the CLV limit position R3 is calculated (step S107).

Finally, the value of the CLV limit position R3 calculated in step S107 is substituted for the control transition point R1 (step S109). Control then advances to S5 in FIG. 3. Subsequent operation is identical to that of the first embodiment above described with reference to FIG. 3, and is therefore omitted below.

The reproducing apparatus RAp1 of the present embodiment of the invention thus differs from a conventional apparatus in which CLV control is used to control reproduction throughout the recording area of the disk-shaped recording medium 1. More specifically, a reproducing apparatus RAp1 exemplary of the present invention increases the rotational speed of the disk-shaped recording medium during CLV-controlled reproduction until the linear velocity is increased to the point at which the frequency of the reproduction signal reaches the maximum data rate that can be processed by the decoder 17, and then controls the rotational speed of the disk to maintain a constant angular velocity in the recording area from this disk position to the outside circumference of the disk.

The reproducing apparatus RAp1 of the invention can therefore immediately resume reproducing the recorded signal as soon as the pickup is moved in the CAV area Acav. The reproducing apparatus RAp1 also requires less time to change the rotational speed of the disk-shaped recording medium 1 when the pickup moves between the CAV area and CLV area, thus reducing the access time and enabling data to be accessed more quickly.

Embodiment 4

The fourth embodiment of the present invention is described next below with reference to FIGS. 9 and 10. It should be noted that this embodiment is an improvement of the reproducing apparatus according to the third embodiment shown in FIGS. 6 to 8.

In the third embodiment above the rotational speed N(R1) at control transition point R1, i.e., maximum allowable rotational speed Nmax(Rmax), is set to the maximum rotational speed N(Rmax), i.e., a speed at which the data rate of the reproduced recording signal Spu does not exceed the maximum linear velocity Lvm of the decoder 17 at the outside circumferential track Rmax of the disk-shaped recording medium 1. However, when the recording area is not completely recorded, i.e., when the user data end position Rue does not equal the outside circumferential track Rmax, it is not necessary to reproduce the recording area on the outside circumference side of the user data end position Rue, i.e., the area between Rue and Rmax. It is therefore possible to increase the rotational speed as far as the data rate of the reproduced recording signal Spu does not exceed the maximum linear velocity Lvm of the decoder 17 at the user data end position Rue.

The reproducing apparatus RAp1 exemplary of the present embodiment therefore calculates the maximum allowable rotational speed Nmax(Rue) at which the data rate of the reproduced recording signal Spu equals the maximum linear velocity Lvm of the decoder 17 at the user data end position Rue of the disk-shaped recording medium 1.

This maximum allowable rotational speed Nmax(Rue) is then used as the maximum value for setting the rotational speed N(R1) of the disk-shaped recording medium 1 at the control transition point R1. By thus determining the rotational speed N(R1), the data rate of the reproduction signal SPU can be kept less than or equal to the maximum data rate Vm throughout that part of the CAV area Acav to which data is actually recorded. The performance of the reproducing apparatus RAp1 can therefore be optimized while reproducing the entire recorded area of the disk-shaped recording medium 1.

The maximum allowable rotational speed Nmax(Rue), i.e., the maximum rotational speed N(Rmax) at the user data end position Rue, of the reproducing apparatus RAp1 during CLV control can be calculated from the inside circumferential track Rmin, user data end position Rue, and maximum linear velocity Lvm of the decoder 17 using the following equation (11).

$$Nmax(Rue)=Lvm/2\pi \cdot Rue \qquad (11)$$

The radial position R4 at which the maximum allowable rotational speed Nmax(Rue) is reached when CAV control is used to reproduce the recording area of the disk-shaped recording medium 1 is then calculated. This CLV limit position R4 is calculated from equation (12).

$$R4=F(Nmax(Rue)) \qquad (12)$$

It is to be noted that R4 can be also expressed by the constance value, Rmax and Lvm, as typically shown in equation (10).

This CLV limit position R4 is then defined as the control transition point R1 of the first embodiment above to enable CAV-controlled reproduction according to the data actually recorded to the CAV area Acav from control transition point R4 (CLV limit position R4) to outside circumferential track Rue without causing the decoder 17 to overflow.

Figure 9:
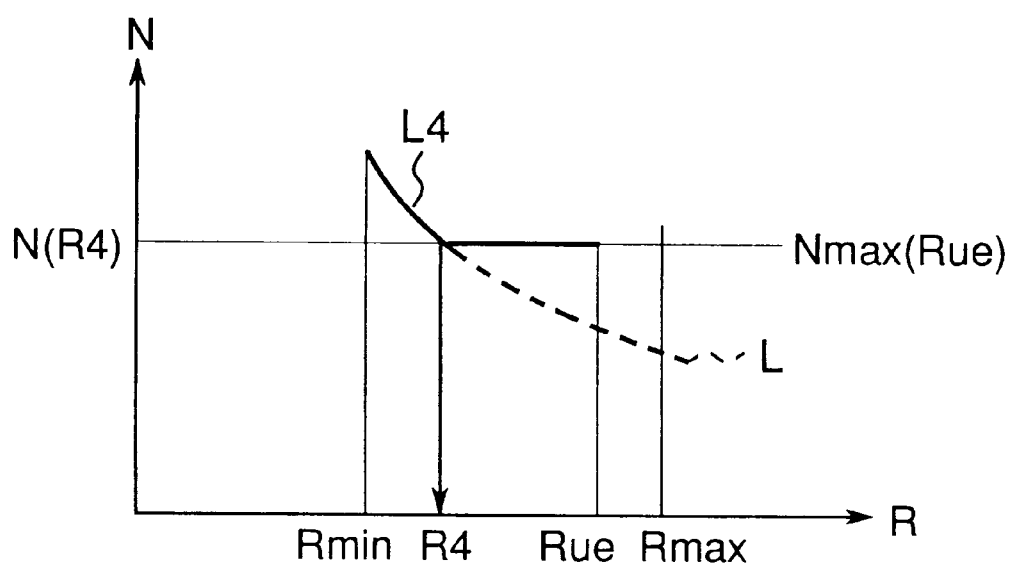
FIG. 9 is a graph used to describe the combination of CLV control and CAV control in a reproducing apparatus according to a fourth embodiment of the invention.
Figure 10:
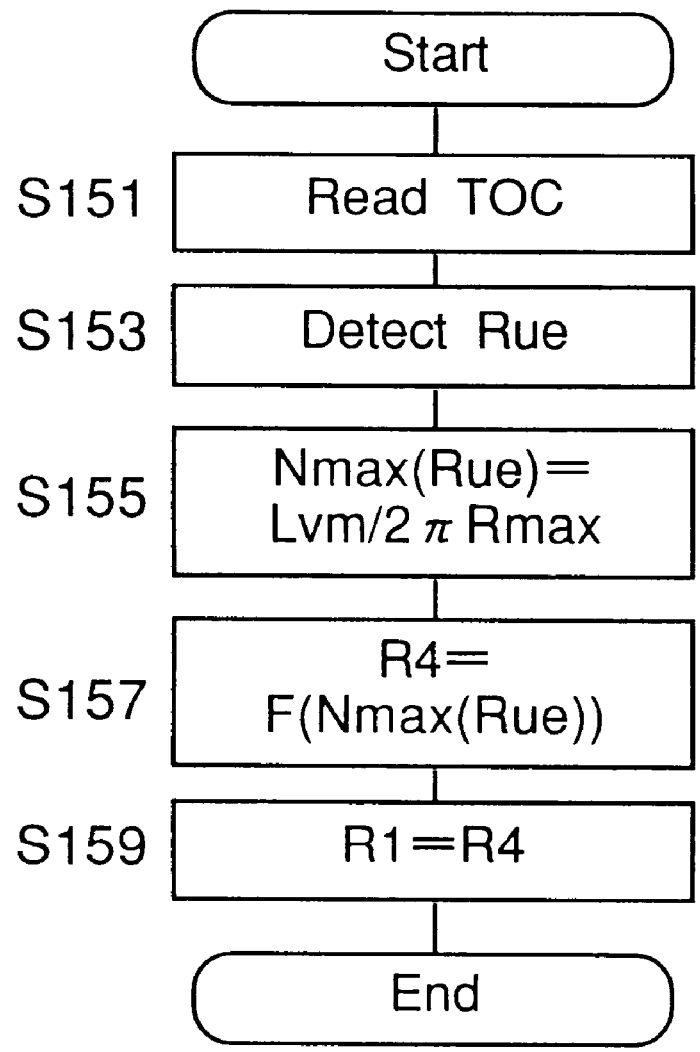
FIG. 10 is a flow chart used to describe the operation of the reproducing apparatus according to the fourth embodiment using the combination of CLV control and CAV control shown in FIG. 9.

The relationship between the radial position R and the rotational speed N in the present embodiment of the invention is shown by solid line L4 in FIG. 9. This relationship according to the prior art is again shown by the dotted line L.

The operation of a reproducing apparatus RAp1 according to the present embodiment of the invention is described next below with reference to the flow chart in FIG. 10. As in the third embodiment above, step S3 in the flow chart shown in FIG. 3 is replaced by steps S151, S153, S155, S157, and S159 in FIG. 10.

In this exemplary operation described below the drive control selection signal Ssw is set to 0 (step S1), and the TOC information is then read (step S151).

The address of the user data end position Rue is then obtained (step S153).

The maximum allowable rotational speed Nmax(Rue) is then calculated based on the maximum linear velocity Lvm and user data end position Rue (step S155).

Next, the CLV limit position R4 is calculated (step S157).

Finally, the value of the CLV limit position R4 calculated in step S157 is substituted for the control transition point R1 (step S159). Control then advances to S5 in FIG. 3. Subsequent operation is identical to that of the first embodiment above described with reference to FIG. 3, and is therefore omitted below.

As thus described, the reproducing apparatus RAp1 exemplary of the present embodiment calculates the maximum rotational speed Nmax based on the user data end position Rue, which marks the end of the actually recorded data, rather than using, as in the third embodiment, the maximum rotational speed Nmax at the outside circumferential track Rmax of the CAV area Acav of the disk-shaped recording medium 1. The reproducing apparatus RAp1 of the present embodiment can therefore use a higher rotational speed for CAV-controlled reproduction, and data can therefore be accessed even more quickly and efficiently in the CAV area Acav.

Embodiment 5

The fifth embodiment of the present invention is described next below with reference to FIGS. 11 and 12. It should be noted that this embodiment is a variation of the reproducing apparatus according to the fourth embodiment shown in FIGS. 9 and 10.

As described above, the reproducing apparatus RAp1 exemplary of the fourth embodiment determines the maximum rotational speed Nmax based not on the outside circumferential track Rmax but on the user data end position Rue. This enables CAV control optimized for the actually recorded recording area (from R1 to Rue) rather than at a slower rotational speed based on the greatest possible CAV area Acav.

The reproducing apparatus RAp1 of the present embodiment, however, provides a means for further optimizing the maximum rotational speed Nmax for that part of the actually recorded CAV area Acav (R1–Rue) that is actually reproduced, i.e., the area from Ru1 to Ru2. While the maximum rotational speed Nmax is determined using the outside circumference position of the recorded CAV area Acav, in practice it is possible to determine the maximum rotational speed Nmax based on the actually reproduced CAV area from the control transition point R1 to Ru2.

Figure 11:
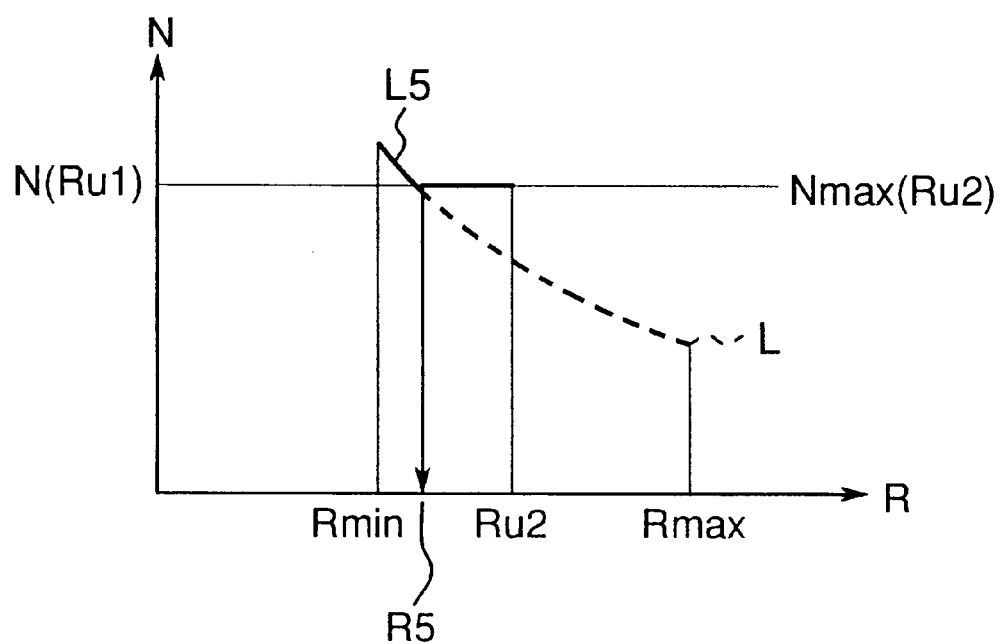
FIG. 11 is a graph used to describe the combination of CLV control and CAV control in a reproducing apparatus according to a fifth embodiment of the invention.
Figure 12:
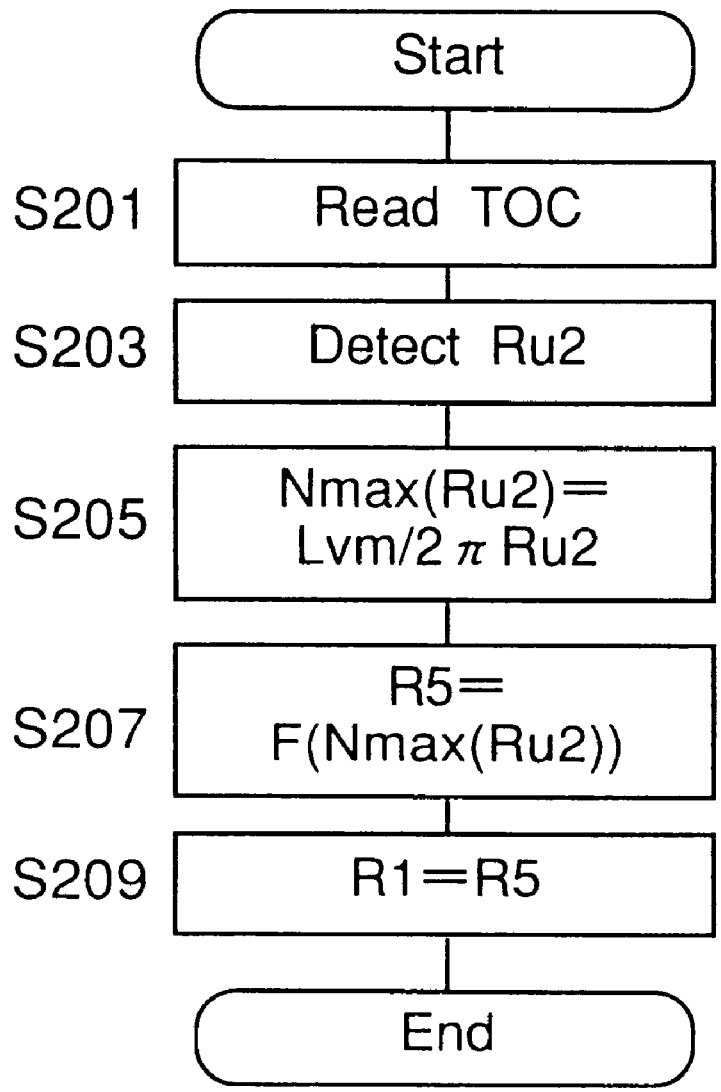
FIG. 12 is a flow chart used to describe the operation of the reproducing apparatus according to the fifth embodiment using the combination of CLV control and CAV control shown in FIG. 11.

The relationship between the radial position R and the rotational speed N in the present embodiment of the invention is shown by solid line L5 in FIG. 11. This relationship according to the prior art is again shown by the dotted line L.

The operation of a reproducing apparatus RAp1 according to the present embodiment of the invention is described next below with reference to the flow chart in FIG. 12. As in the fourth embodiment above, step S3 in the flow chart shown in FIG. 3 is replaced by steps S201, S203, S205, S207, and S209 in FIG. 12.

In this exemplary operation described below the drive control selection signal Ssw is set to 0 (step S1), and the TOC information is then read (step S201).

The address of the reproduction area end position Ru2 is then obtained (step S203).

The maximum allowable rotational speed Nmax(Ru2) is then calculated based on the maximum linear velocity Lvm and reproduction area end position Ru2 (step S205) using the following equation (13).

$$Nmax = Lvm/2\pi \cdot Ru2 \quad (13)$$

Next, the CLV limit position R5 is calculated (step S207).

Finally, the value of the CLV limit position R5 calculated in step S207 is substituted for the control transition point R1 (step S209). Control then advances to S5 in FIG. 3. Subsequent operation is identical to that of the first embodiment above described with reference to FIG. 3, and is therefore omitted below.

As thus described, the reproducing apparatus RAp1 exemplary of the present embodiment calculates the maximum rotational speed Nmax based on the reproduction area end position Ru2, which marks the end of the recording area to be actually reproduced, rather than using, as in the fourth embodiment, the user data end position Rue, which marks the end of the actually recorded data of the CAV area Acav of the disk-shaped recording medium 1. The reproducing apparatus RAp1 of the present embodiment can therefore use a yet higher rotational speed for CAV-controlled reproduction, and data can therefore be accessed even more quickly and efficiently in the CAV area Acav.

Embodiment 6

A sixth embodiment of a reproducing apparatus RAp1 exemplary of the present invention is described next below with reference to FIGS. 13 and 14. This embodiment is a variation of the second embodiment described previously with reference to FIGS. 4 and 5, and provides a method of optimizing the radial position of the control transition point R2 and the initial rotational speed N(Rmin).

More specifically, once the initial rotational speed N(Rmin) at the inside circumferential track Rmin is determined, the optimum position R6 of the control transition point R2 at which the data rate of the reproduced recording signal Spu reaches the maximum data rate Vm, and which marks the edge of the CAV area Acav, can be obtained.

Furthermore, once the optimum position R6 of the control transition point R2 is known, the optimum rotational speed Nmax(R6) for the initial rotational speed N(Rmin) can be determined.

Optimizing the radial position of the control transition point R2 and the initial rotational speed N(Rmin) by means of the present embodiment is described next with reference to FIG. 13.

Figure 13:
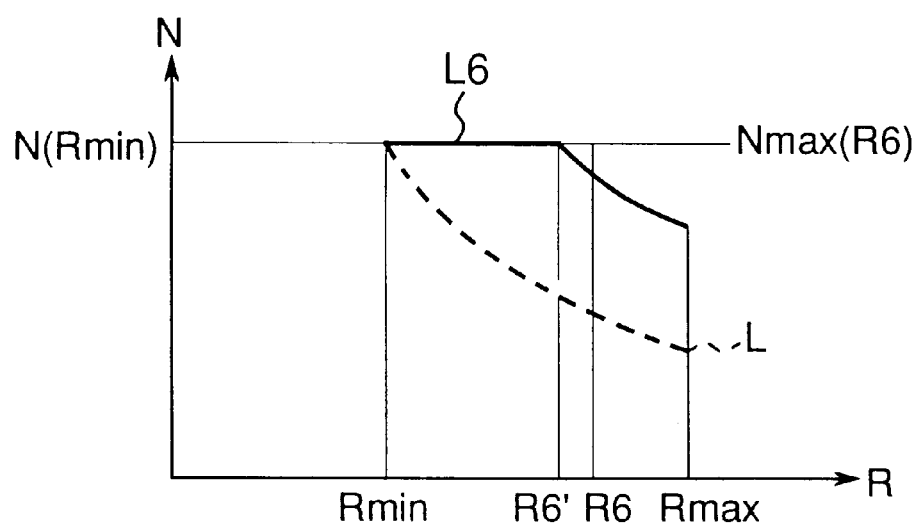
FIG. 13 is a graph used to describe the combination of CLV control and CAV control in a reproducing apparatus according to a sixth embodiment of the invention.
Figure 14:
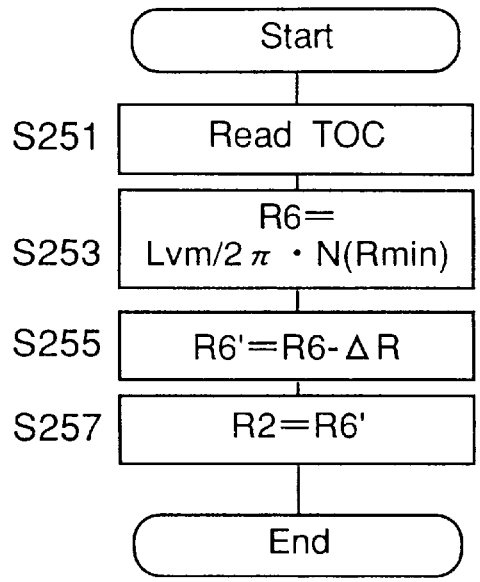
FIG. 14 is a flow chart used to describe the operation of the reproducing apparatus according to the sixth embodiment optimizing the radial position for the combination of CLV control and CAV control shown in FIG. 13.

The relationship between the radial position R and the rotational speed N in the present embodiment of the invention is shown by solid line L6 in FIG. 13. This relationship according to the prior art is again shown by the dotted line L.

The control transition point R2 is optimized by calculating a first maximum data rate radial position R6 based on a particular initial rotational speed N(Rmin). The location of radial position R6 is then shifted distance ΔR to the inside circumference side of the calculated position R6 to obtain radial position R6'. This radial position R6' is then defined as control transition point R2. Note that distance ΔR is determined based on variations in the performance of the decoder 17 and other signal processing components.

The initial rotational speed N(Rmin) is then optimized by first calculating the maximum allowable rotational speed Nmax(R2) based on a particular control transition point R2. The maximum data rate radial position R6 is then calculated. A rotational speed less than the calculated maximum allowable rotational speed Nmax(R2) is then set as the initial rotational speed N(Rmin) to allow for variations in the performance of the signal processing system.

The data rate of the reproduction signal SPU in the CAV area Acav on the inside circumference side of radial position R2 (R6') can thus be kept below the maximum data rate Vm. The performance of the reproducing apparatus RAp1 can thus be effectively utilized, the entire recording area of the disk-shaped recording medium 1 can be reproduced, and the time required to adjust the disk speed can be reduced. Data can therefore be read more quickly and efficiently. Furthermore, even when the pickup 6 is quickly passing over the boundary between CAV area and CLV, it is possible to retain the time lag caused by the changing the reproduction mode.

The operation of a reproducing apparatus RAp1 according to the present embodiment of the invention is described next below with reference to the flow chart in FIG. 14. Note that step S53 in the flow chart shown in FIG. 5 is replaced by steps S251, S253, S255, and S257 in FIG. 14.

In this exemplary operation described below the drive control selection signal Ssw is set to 1 (step S1), and the TOC information is then read (step S251).

The maximum data rate radial position R6 is then calculated based on the maximum linear velocity Lvm and initial rotational speed N(Rmin) (step S253) using the following equation (14).

$$R6 = Lvm/2\pi \cdot N(Rmin) \quad (14)$$

The location of radial position R6 is then shifted distance ΔR to the inside circumference side of the calculated position R6 to obtain radial position R6' (step S255).

Finally, the value of position R6' is substituted for the control transition point R2 (step S257). Control then advances to S55 in FIG. 5. Subsequent operation is identical to that of the first embodiment above described with reference to FIG. 3, and is therefore omitted below.

Figure 15:
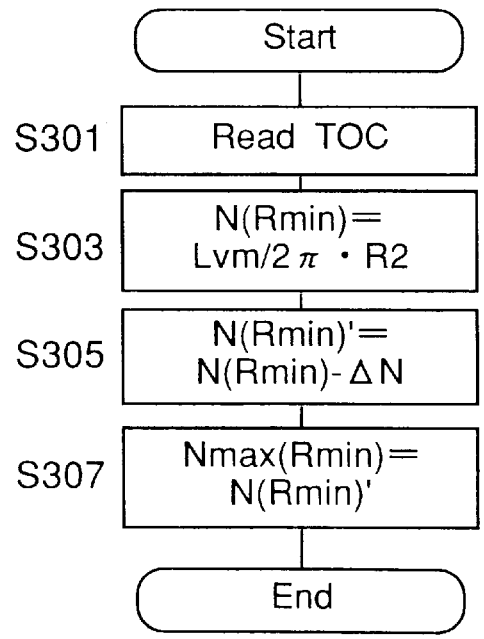
FIG. 15 is a flow chart used to describe the operation of the reproducing apparatus according to the sixth embodiment optimizing the maximum rotational speed for the combination of CLV control and CAV control shown in FIG. 13.

The method of optimizing the initial rotational speed N(Rmin) in a reproducing apparatus RAp1 according to the present embodiment of the invention is described next below with reference to the flow chart in FIG. 15. Note that to optimize the initial rotational speed N(Rmin) step S53 in the flow chart shown in FIG. 5 further also replaced by steps S301, S303, S305, and S307 in FIG. 15.

In this exemplary operation described below the drive control selection signal Ssw is set to 1 (step S1), and the TOC information is then read (step S301).

The initial rotational speed N(Rmin) is then calculated based on the maximum linear velocity Lvm and the previously determined control transition point R2 (step S303) using the following equation (15).

$$N(Rmin) = Lvm/2\pi \cdot R2 \quad (15)$$

The calculated speed N(Rmin) is then reduced by a particular difference ΔN to obtain speed N(Rmin)'. This value N(Rmin)' is then substituted for Nmax(Rmin), and control passes to step S55 in FIG. 5.

Thus comprised, the reproducing apparatus RAp1 according to the present embodiment can reproduce the CAV area Acav of the disk-shaped recording medium 1 more efficiently than can the reproducing apparatus RAp1 according to the second embodiment of the invention above.

Embodiment 7

The seventh embodiment of a reproducing apparatus RAp2 according to the present invention is described next with reference to FIGS. 16 to 19.

Figure 16:
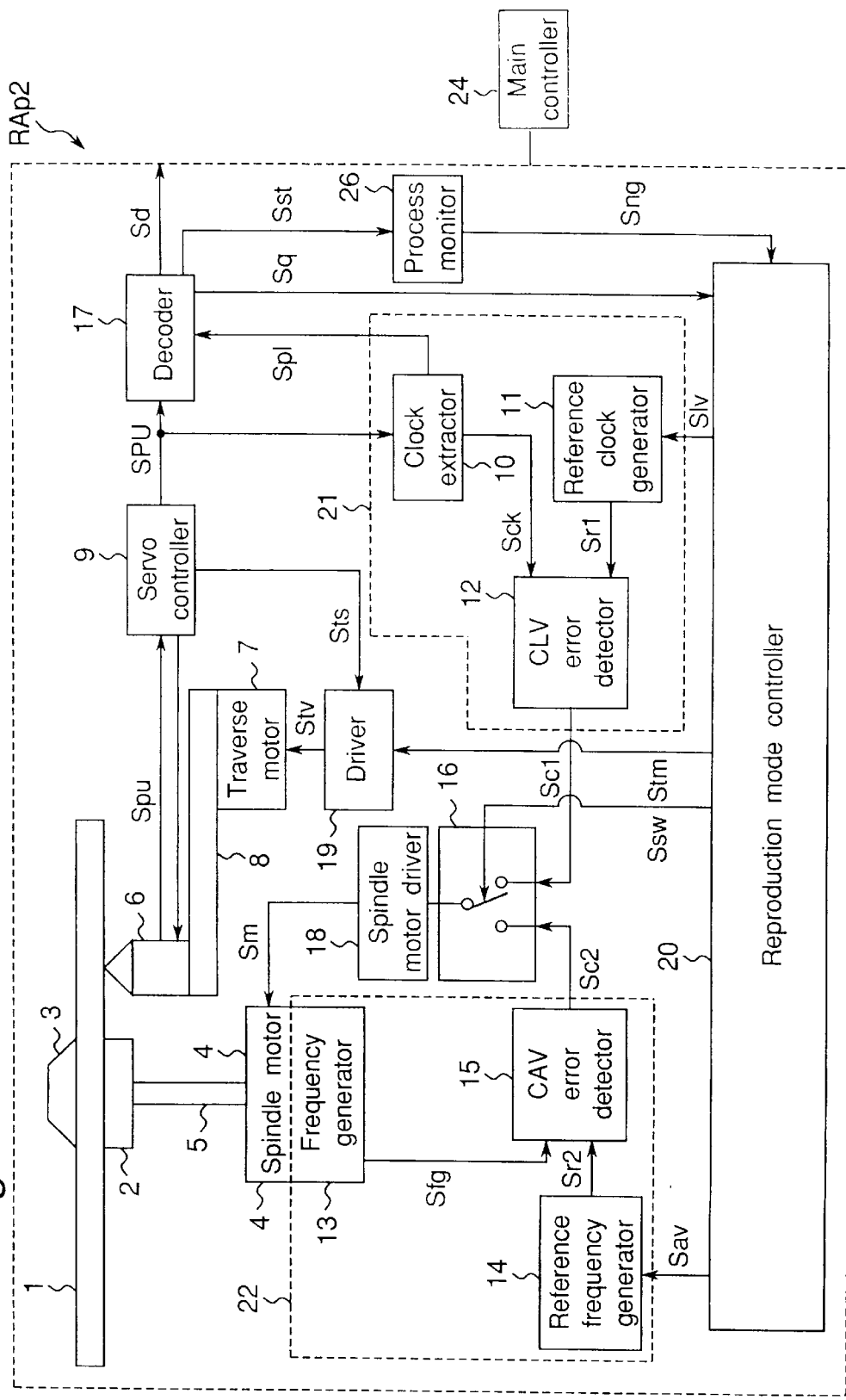
FIG. 16 is a block diagram of a disk-shaped recording medium reproducing apparatus according to a seventh embodiment of the invention.

As shown in FIG. 16, this embodiment differs from the preceding embodiments by the addition of a process monitor 26 and using the decoder 17 that outputs a decoder status signal SST to the process monitor 26.

This decoder status signal SST represents the signal processing status of the decoder 17, and is used by the process monitor 26 to generate a decoding abnormality signal Sng. When the decoder 17 correctly processes the reproduction signal SPU, the decoding abnormality signal Sng is LOW. Otherwise the decoding abnormality signal is HIGH. The decoding abnormality signal is output to the reproduction mode controller 20 to notify the reproduction mode controller 20 whether a decoder overflow has occurred. In this embodiment, HIGH and LOW are represented by 1 (one) and 0 (zero), respectively.

When the decoding abnormality signal is HIGH, the linear velocity at the current radial position R of the pickup 6 is too high, and the decoder 17 cannot process the reproduction signal SPU. The reproduction mode controller 20 therefore gradually slows the spindle motor 4 to reduce the data rate of the reproduction signal SPU. When the data rate of the reproduction signal SPU slows to the maximum data rate Vm of the decoder 17, the decoder 17 correctly decode the reproduction signal Spu, and the decoding abnormality signal goes LOW. The reproduction mode controller 20 then stops deceleration control of the spindle motor 4.

The operation of a reproducing apparatus RAp2 according to the present embodiment of the invention is described next below with reference to the flow chart in FIG. 17. Note that step S59 in the flow chart shown in FIG. 5 is replaced by steps S351, S353, S355, S357, S359, S361, and S363 in FIG. 17.

Figure 5:
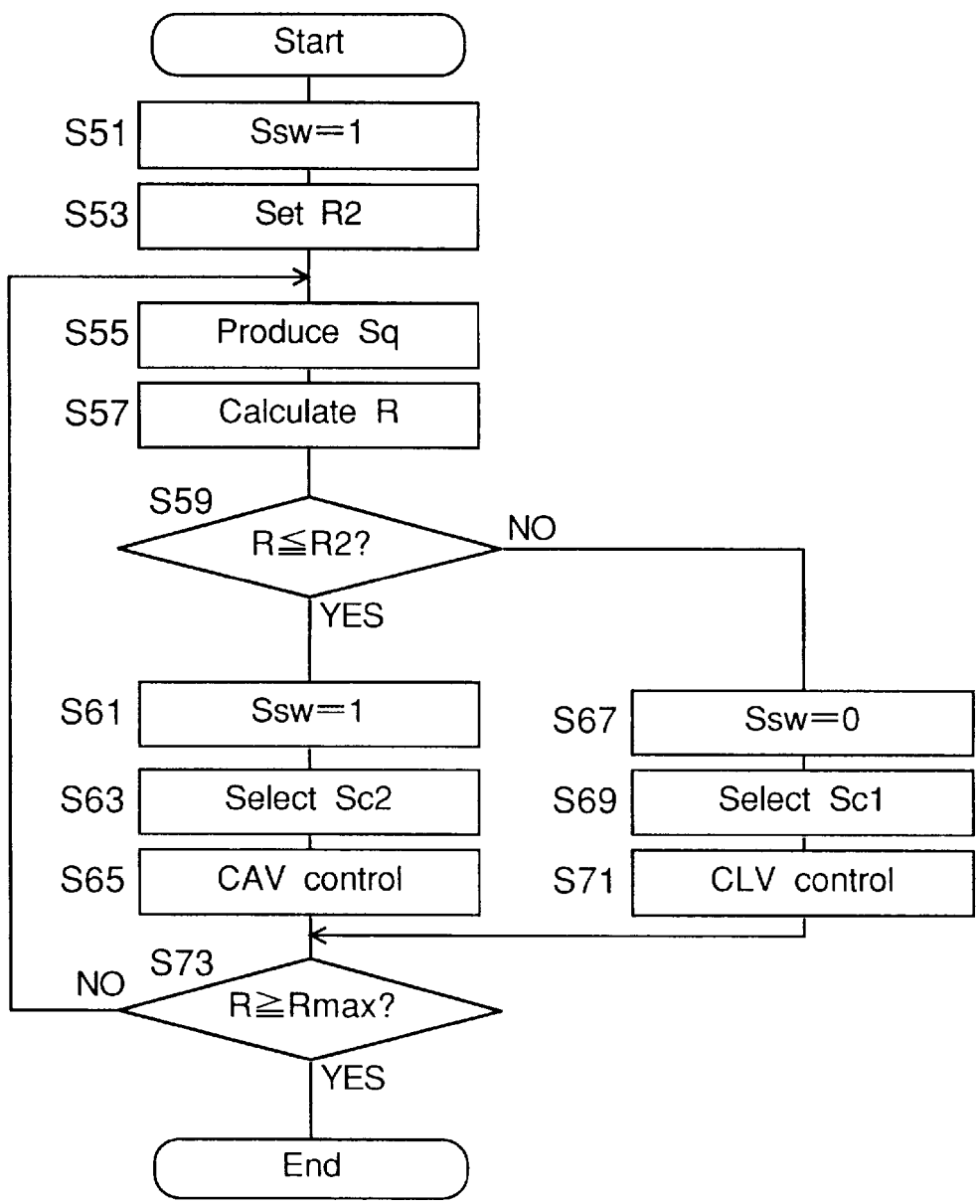
FIG. 5 is a flow chart used to describe the operation of the reproducing apparatus according to the second embodiment using the combination of CLV control and CAV control shown in FIG. 4.

When reproduction starts in this embodiment steps S51, S53, S55, and S57 shown in FIG. 5 are executed to start CAV control at the initial rotational speed N(Rmin). Control then advances to S351.

It is then determined whether the decoding abnormality signal is LOW (0). This determines whether the data rate of the reproduction signal SPU exceeds the maximum data rate Vm of the decoder 17. If the data rate does not exceed the maximum data rate Vm, YES is returned. Control then advances to S61, FIG. 5, and CAV control as described in the second embodiment continues.

Figure 17:
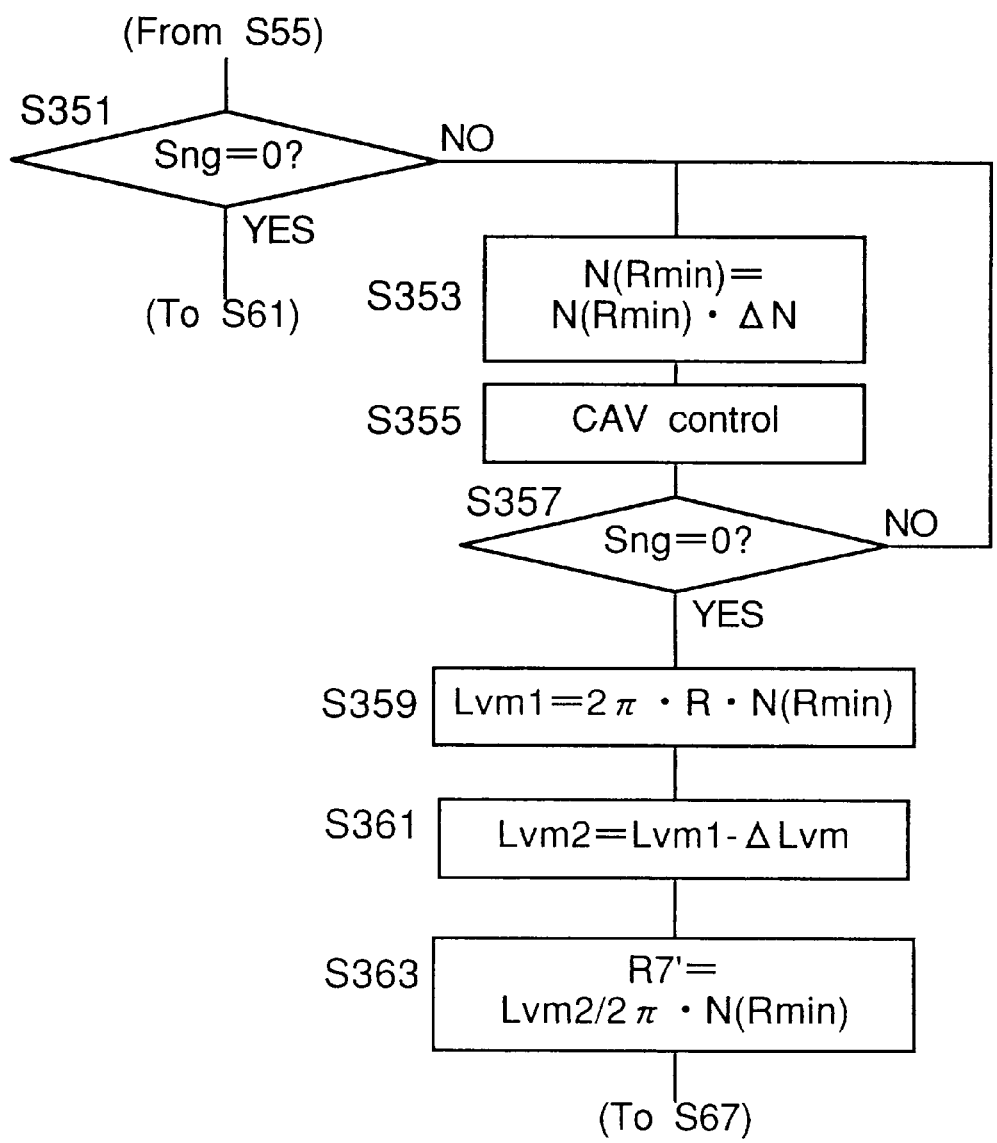
FIG. 17 is a flow chart used to describe the operation of the reproducing apparatus according to the seventh embodiment using the combination of CLV control and CAV control shown in FIG. 16.

However, if the data rate of the reproduction signal SPU exceeds the maximum data rate Vm and the decoding abnormality signal is therefore HIGH (1), control advances to step S353 in FIG. 17.

The initial rotational speed N(Rmin) is then reduced by a particular difference ΔN to obtain speed N(Rmin)' (step S353). Control then advances to S355. Note that the value of difference ΔN is equal to any fraction of the resolution of the spindle speed signal Sfg in this embodiment.

CAV control is then attempted using the rotational speed N(Rmin) stepped down in step S353 (step S355), and control passes to S357. Note that the CAV control method implemented in step S355 is identical to that of steps S61, S63, and S65 above.

It is again tested whether the decoding abnormality signal is LOW (=0). If not, the spindle motor 4 deceleration applied in step S353 was not enough. The procedure therefore loops back to step S353. Steps S353 and S355 are then repeated to further decelerate the spindle motor 4 and test CAV control. This loop continues until step S357 returns YES. Further deceleration of the spindle motor 4 is then no longer necessary, and control passes to S359.

A new maximum linear velocity Lvm1 is then calculated based on the rotational speed N(Rmin) obtained from step S353 and the current radial position R obtained in step S57 (step S359) using equation (16) below.

$$Lvm1 = 2\pi \cdot R \quad (16)$$

This maximum linear velocity Lvm1 represents the maximum linear velocity accounting for variations in the performance of the reproducing apparatus RAp2, individual disk-shaped recording media 1, the current actual operating environment, and aging. This maximum linear velocity Lvm1 is then passed to step S361.

The maximum linear velocity Lvm1 obtained in step S359 is then decreased by a known amount ΔLvm to obtain the practical maximum linear velocity Lvm2. Like the ΔN and ΔR values above, ΔLvm corresponds to a safety margin used to account for dimensional and eccentricity variations in the disk-shaped recording medium 1, and other factors, to assure reliable operation and performance. More specifically, ΔLvm is greater than zero and should be determined based on the specific disk-shaped recording medium 1 and the mounting precision thereof.

The practical control transition point R7' is then calculated based on the practical maximum linear velocity Lvm2 from S359 (step S363) using the following equation (17). Control then advances to S67.

$$R7'=LVM2/2\pi \cdot N(Rmin) \quad (17)$$

CLV control is then effected for reproduction based on the current rotational speed N(Rmin) (step S365), and control thus passes to step S67 in FIG. 5. Subsequent CLV control operation follows the process described in the second embodiment above.

It should be noted that the practical control transition point R7', practical maximum linear velocity Lvm2, and initial rotational speed N(Rmin) obtained from the process described above are stored in the reproduction mode controller 20 of the reproducing apparatus RAp2, and used thereafter to set the control transition point R2 and initial rotational speed N(Rmin) of the disk-shaped recording medium 1. It will be obvious, however, that even if the maximum linear velocity Lvm changes every time the reproducing apparatus RAp2 is used, it is constantly set to obtain the optimum performance from the signal processing circuit [decoder 17] under the current operating environment. As a result, a reproducing apparatus providing stable operation under different operating environments and over time can be achieved.

Figure 18:
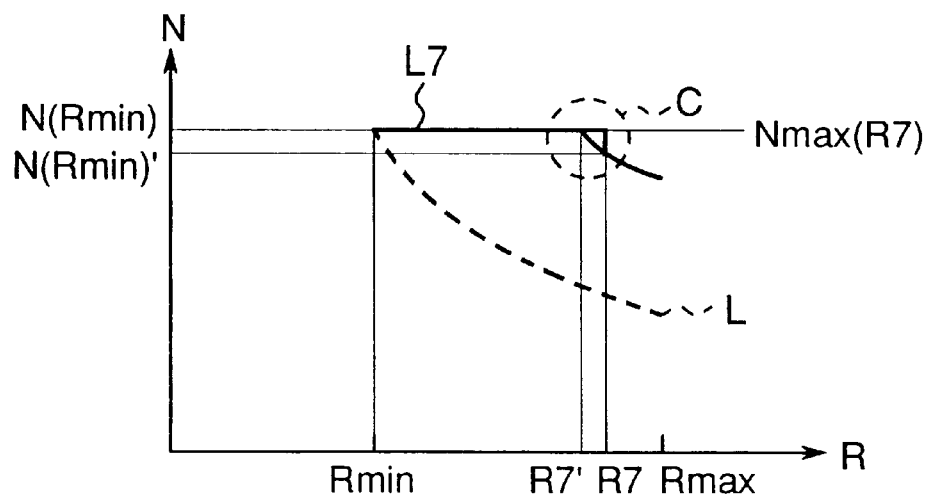
FIG. 18 is a graph showing the relationship between maximum rotational speed, practical rotational speed, the maximum control transition point, and the practical control transition point using the combination of CLV control and CAV control shown in FIG. 16.
Figure 19:
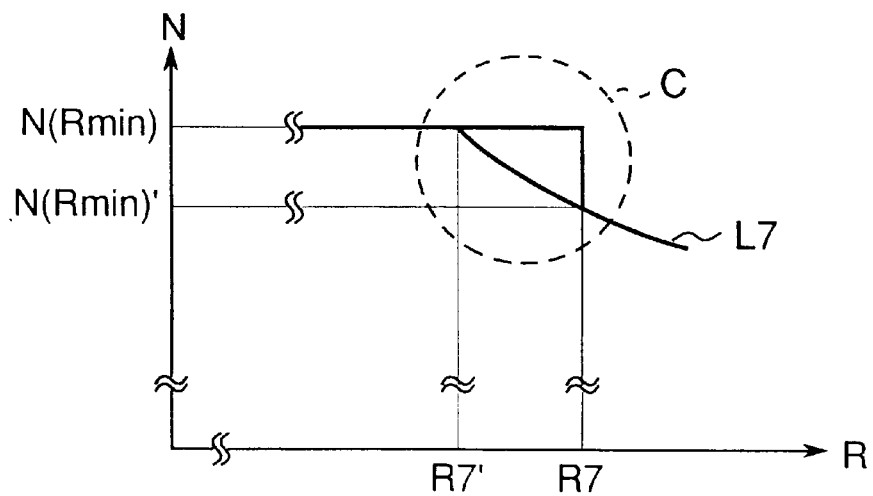
FIG. 19 is an enlarged view of part of FIG. 18.

The relationship between the initial rotational speed N(Rmin), the initial rotational speed N(Rmin) for practical control, the control transition point R7, and the practical control transition point R7' is shown in FIGS. 18 and 19. Note that control transition point R7 is position at which the practical maximum linear velocity Lvm2 was obtained based on the maximum linear velocity Lvm1 in step S361.

The relationship between radial position and rotational speed in the reproducing apparatus RAp2 of the present embodiment is shown by solid line L7. This relationship during CLV control by an apparatus according to the prior art is again shown by dotted line L.

The area within circle C in FIG. 18 is the area corresponding to the safety margin described in steps S357 and S361 in FIG. 17, and is shown enlarged in FIG. 19.

It should also be noted that while the present embodiment has been described with specific reference to lowering the rotational speed during CAV control, it is also obviously possible to reduce the rotational speed after switching to CLV control.

Embodiment 8

The eighth embodiment of a reproducing apparatus RAp3 according to the present invention is described next with reference to FIG. 20.

As described in the first through seventh embodiments above, the current reproduction of the reproducing apparatus, i.e., the current radial position R of the pickup 6, is detected based on the subcode information signal Sq contained in the reproduction signal SPU. The present embodiment of the invention, however, teaches a detection method not based on the subcode information signal Sq.

Figure 20:
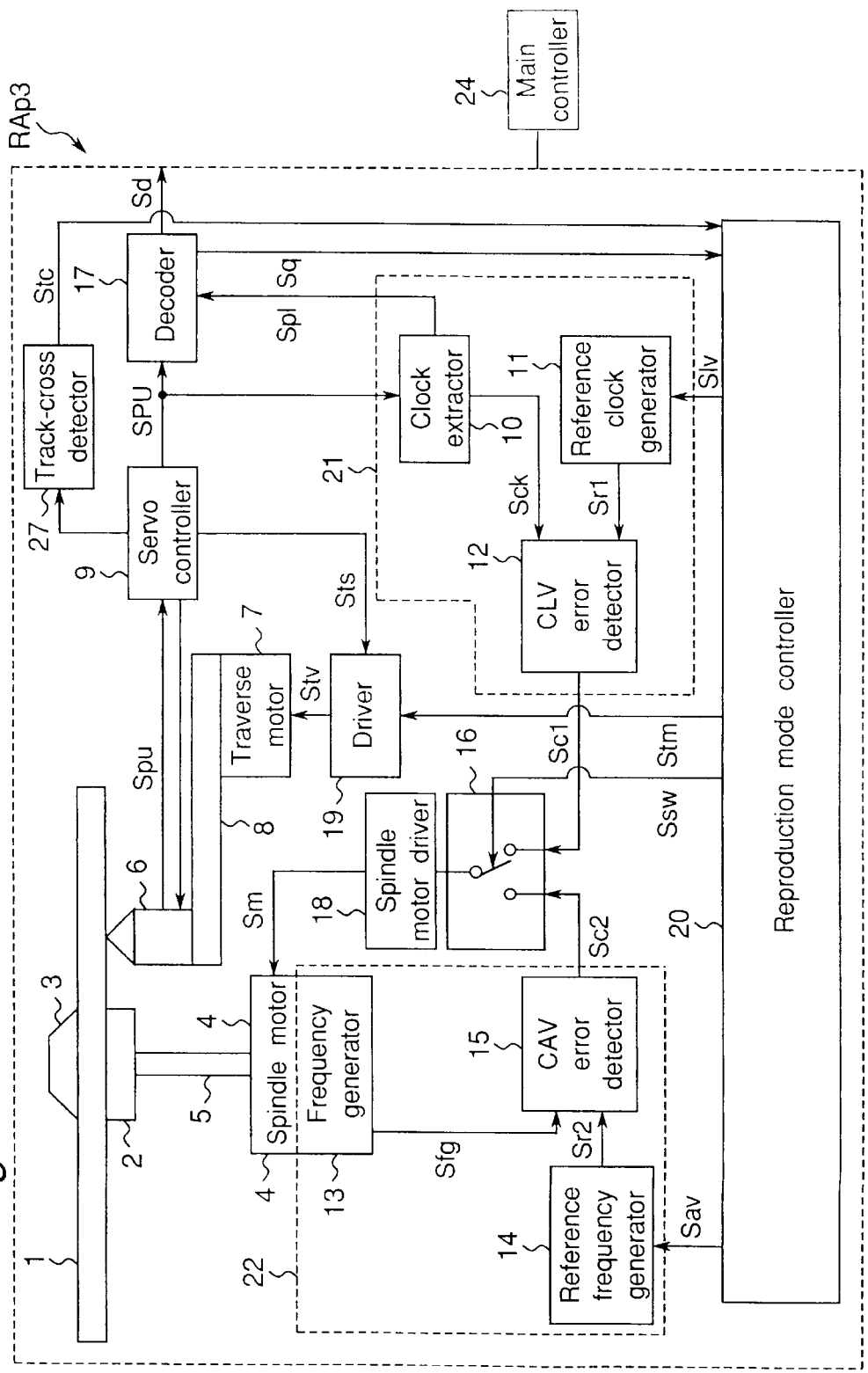
FIG. 20 is a block diagram of a disk-shaped recording medium reproducing apparatus according to an eighth embodiment of the invention.

As shown in FIG. 20, the reproducing apparatus RAp3 of the present embodiment differs from the reproducing apparatus RAp1 shown in FIG. 1 by the addition of a track cross detector 27 and using the servo controller 9 that outputs a tracking error signal Ste.

The servo controller 9 supplies the tracking error signal Ste to the track cross detector 27. Based on the tracking error signal Ste, the track cross detector 27 then generates a track cross signal Stc. The track cross signal Stc indicates when the pickup 6 crosses a signal track recorded on the disk-shaped recording medium 1. The track cross detector 27 then outputs the track cross signal Stc to the reproduction mode controller 20. The reproduction mode controller 20 then counts the track cross signal Stc to know the position of the pickup 6.

More specifically, the pickup 6 outputs a data signal when it is positioned on a signal track as it is moved by the traverse motor 7 along the slider 8 toward the outside circumference while reproducing data from the inside circumference area of the disk-shaped recording medium 1. When the pickup 6 is positioned between signal tracks as it moves from track to track, however, it cannot output a data signal. The reproduction mode controller 20 knows how many signal tracks have been crossed by counting the pulses in the track cross signal Stc. To calculate the position of the pickup 6 on the disk-shaped recording medium 1, the number of tracks crossed is simply multiplied by the signal track pitch of the disk-shaped recording medium 1.

It is therefore possible to provide a reproducing apparatus which, in addition to the previously described benefits of the invention, can calculate the current reproduction position of the pickup on the disk-shaped recording medium by a simple calculation based on the presence or absence of a pickup output signal when the pickup crosses a signal track on the disk-shaped recording medium as it traverses the recording area. It is therefore not necessary to interpret the subcode information signal Sq contained in the reproduction signal SPU.

Embodiment 9

The ninth embodiment of a reproducing apparatus RAp4 according to the present invention is described next with reference to FIG. 21.

As in the eighth embodiment above, the present embodiment teaches a method of detecting the current reproduction of the reproducing apparatus, i.e., the current radial position R of the pickup 6, that is not based on the subcode information signal Sq contained in the reproduction signal SPU.

Figure 21:
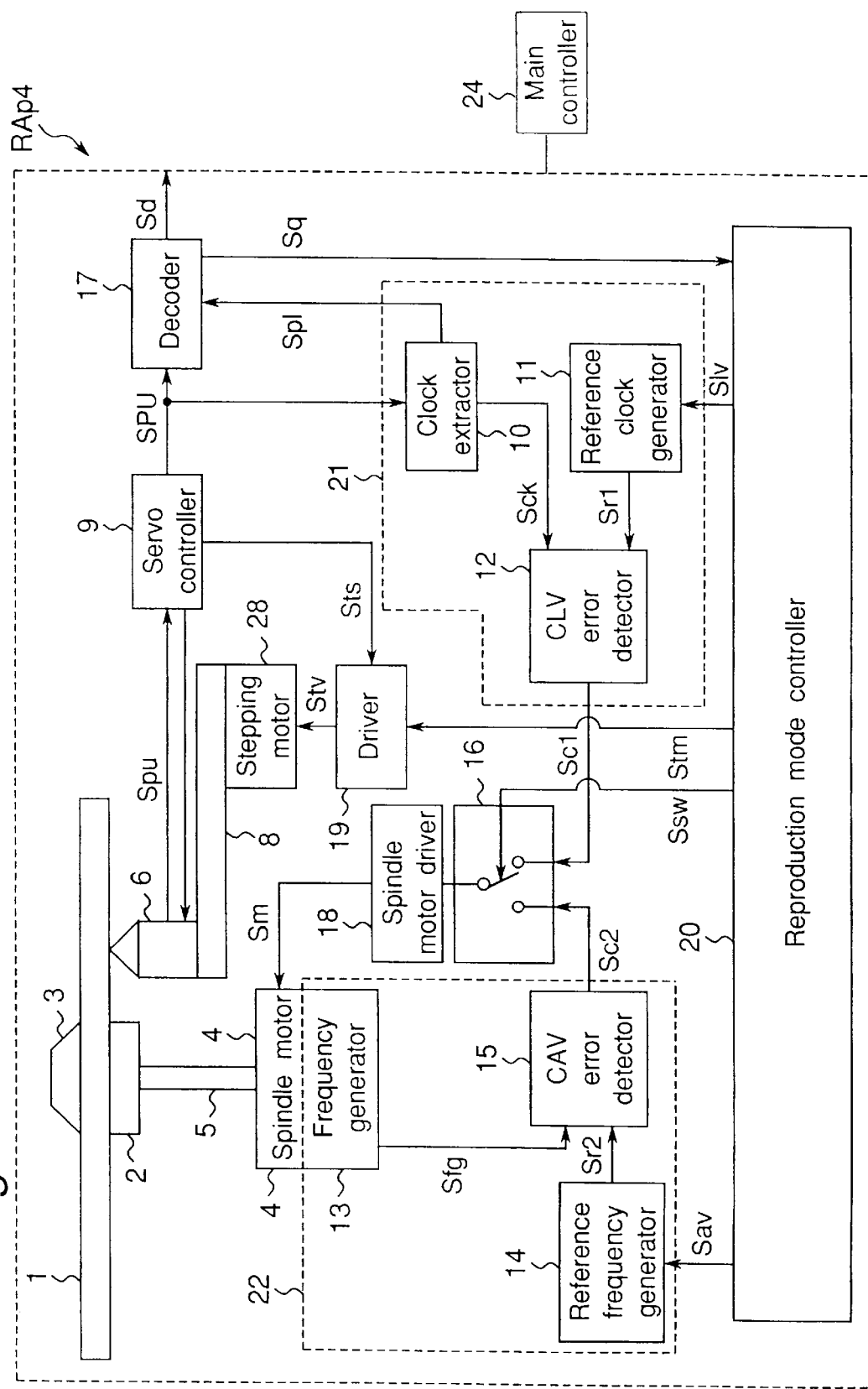
FIG. 21 is a block diagram of a disk-shaped recording medium reproducing apparatus according to a ninth embodiment of the invention.

As shown in FIG. 21, the reproducing apparatus RAp4 of the present embodiment differs from the reproducing apparatus RAp1 shown in FIG. 1 by substituting a stepping motor 28 for the traverse motor 7, eliminating the traverse motor driver 19, and outputting the traverse tracking error signal Sts from the servo controller 9 to the reproduction mode controller 20.

A stepping motor 28 is thus used as the traverse motor for driving pickup 6 along the slider 8 radially to the disk-shaped recording medium 1 as the information recorded on the disk-shaped recording medium 1 is reproduced from inside circumference to outside circumference. The reproduction mode controller 20 supplies the traverse movement signal Stm to drive the stepping motor 28 in the same manner as driving the traverse motor 7 of the preceding embodiments. Specifically, when the pickup 6 is reproducing an inside circumference area of the disk-shaped recording medium 1, and the main controller 24 instructs the reproduction mode controller 20 to move the pickup 6 toward the outside circumference of the disk-shaped recording medium 1, the reproduction mode controller 20 outputs an traverse movement signal Stm to the stepping motor 28. The stepping motor 28 then moves the pickup 6 on the slider 8 toward the outside circumference.

How far the spindle of the stepping motor 28 turns is determined by the number of pulses in the drive signal from the reproduction mode controller 20. The pickup 6 thus moves in a direct, 1:1 correlation to the distance specified by the reproduction mode controller 20. The spindle motor driver 18 can therefore know precisely how far the pickup 6 has moved from the control signal supplied to the stepping motor 28.

It is therefore possible to provide a reproducing apparatus which, in addition to the previously described benefits of the invention, can know the current reproduction position of the pickup on the disk-shaped recording medium from the drive signal supplied to the stepping motor 28 used to move the pickup 6. It is therefore not necessary to interpret the subcode information signal Sq (address information) contained in the reproduction signal SPU from the disk.

Embodiment 10

Figure 22:
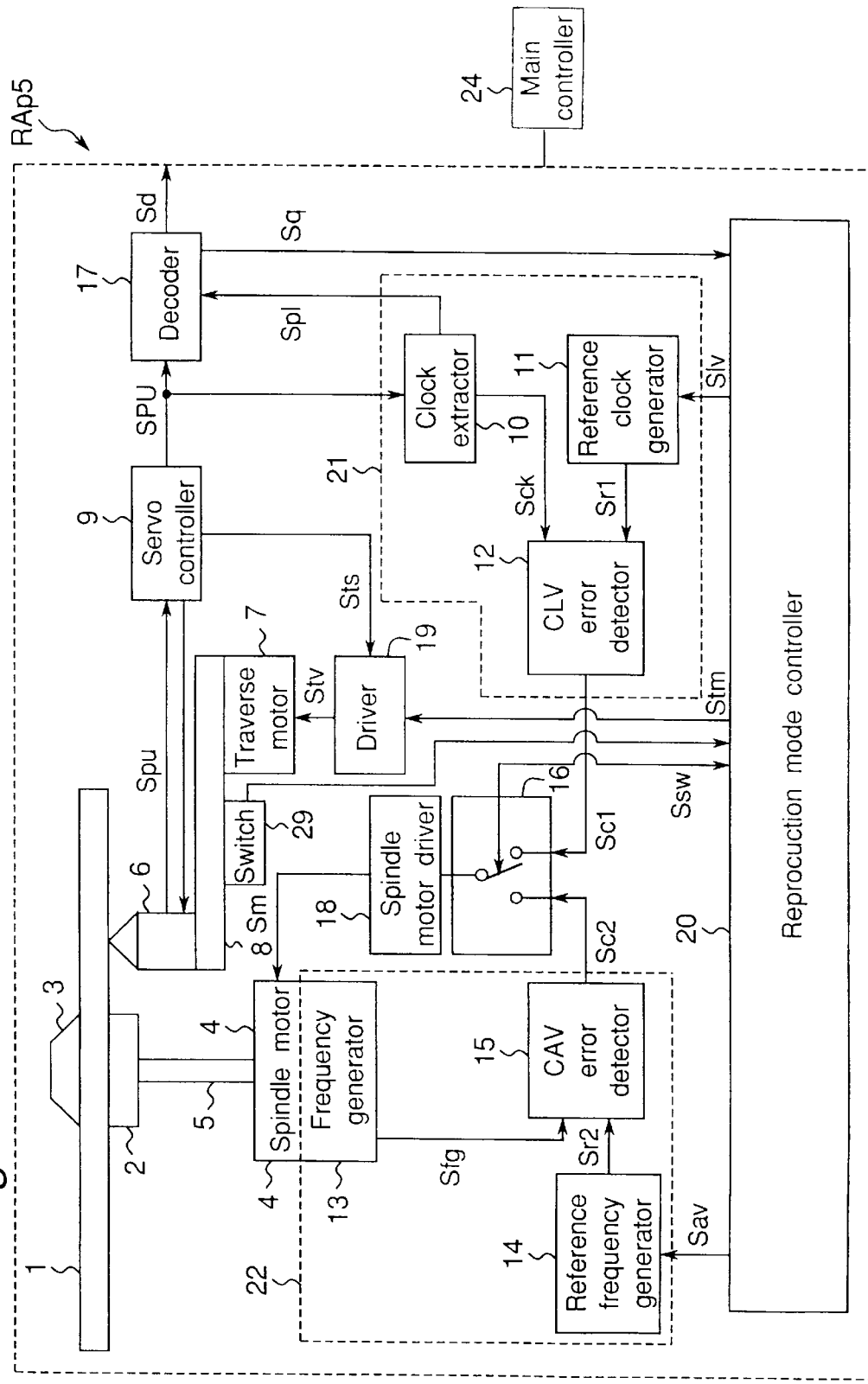
FIG. 22 is a block diagram of a disk-shaped recording medium reproducing apparatus according to a tenth embodiment of the invention.

The tenth embodiment of a reproducing apparatus RAp5 according to the present invention is described next with reference to FIG. 22.

As in the eighth and ninth embodiments above, the present embodiment teaches a method of detecting the current reproduction of the reproducing apparatus, i.e., the current radial position R of the pickup 6, that is not based on the subcode information signal Sq contained in the reproduction signal SPU.

This embodiment accomplishes this by providing a switch 29 for knowing the position of the pickup 6 on the slider 8 of the reproducing apparatus RAp1 shown in FIG. 1. The switch 29 inputs a switching signal Sw indicating whether the switch 29 is open or closed to the reproduction mode controller 20.

When the pickup 6 is reproducing an inside circumference area of the disk-shaped recording medium 1, and the main controller 24 instructs the reproduction mode controller 20 to move the pickup 6 toward the outside circumference of the disk-shaped recording medium 1 in the reproducing apparatus RAp5 thus comprised, the traverse motor 7 moves the pickup 6 on the slider 8 toward the outside circumference. When the pickup 6 reaches the position of the switch 29 during this traverse movement, the switch 29 changes from open to closed. This change in switch status, i.e., that the pickup 6 has reached the switch 29, can be detected by the reproduction mode controller 20 based on the switching signal Sw.

It is therefore possible by means of the reproducing apparatus RAp5 exemplary of the present embodiment to know the current reproduction position of the pickup on the disk-shaped recording medium from the state change of the switch 29 provided on the slider 8 along which the pickup 6 travels. It is therefore not necessary to interpret the subcode information signal Sq (address information) contained in the reproduction signal SPU from the disk.

It should be noted that while a mechanical switching means has been described above, the invention shall not be so limited. It will be obvious that other switching means, including an optical sensor, magnetic sensor, and other non-contact switching devices can be used. Furthermore, while the switching means of the present embodiment is shown as a circuit block in FIG. 22, part or all of the circuit operation can be accomplished in the software program of the microcontroller.

Figure 23:
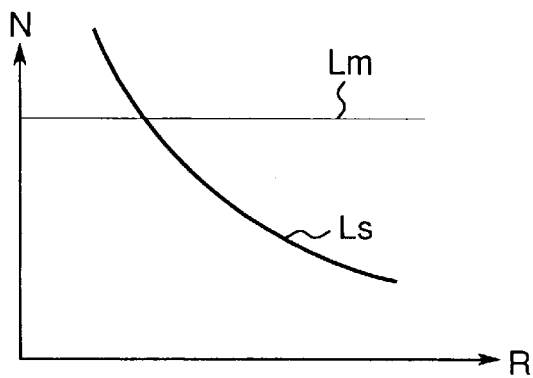
FIG. 23 is a graph showing the relationship between constraints of the mechanical drive system and signal processing circuit on the maximum allowable rotational speed of a disk-shaped recording medium.

The relationship between mechanical factors and signal processing factors affecting the maximum allowable linear velocity of the disk-shaped recording medium reproducing apparatus of the present invention is described next below with reference to FIG. 23.

As shown in FIG. 30, the radial position R of the pickup 6 on the disk-shaped recording medium 1 during reproduction is shown on the axis of abscissae, and the rotational speed N of the disk-shaped recording medium 1 is shown on the axis of ordinates. Line Lm indicates the maximum allowable speed of the mechanical drive system, represented by the spindle motor 4, and curve Ls indicates the maximum allowable speed of the signal processing circuit, represented by the decoder 17.

Note, further, that the maximum allowable speed of the mechanical drive system is not constrained by the radial position R, but the maximum rotational speed Nmax of the signal processing circuit is substantially equal to the maximum linear velocity, and is therefore proportional to $\frac{1}{2}\pi R$ as previously described.

More precisely, the maximum rotational speed Nmax of the mechanical drive system is not constant. There are various reasons for this, including variations in the manufacturing precision of the disk-shaped recording medium. For example, an eccentric center of gravity in the disk medium will produce oscillations that prevent servo control at a given rotational speed, thereby requiring the disk speed to be dropped for recording and reproduction. A loss of lubrication over time in the spindle motor also reduces the rotational speed. There are also such thermal factors as a loss of torque from heating of the spindle motor, heat-affected deterioration of spindle motor driver performance. Environmental factors also come into play.

Constraints limiting the maximum allowable rotational speed N(Rmax) of the signal processing circuit include the limited operating frequency of the signal processing circuit itself, and a drop in the operating frequency caused by heating.

The theoretical maximum allowable rotational speed Nmax is therefore reduced during disk manufacture by a safety margin accounting for the maximum anticipated fluctuation in these and other constraint factors. As a result, the full potential performance of the drive apparatus cannot be achieved, and performance is thus wasted.

Therefore, the present invention provides a disk-shaped recording medium reproducing apparatus whereby maximum performance can be achieved by minimizing the safety margin applied to these constraints, and enabling disk drive to be optimized to the actual operating environment. A preferred method of achieving this is described below with reference to FIGS. 24 to 28.

Figure 24:
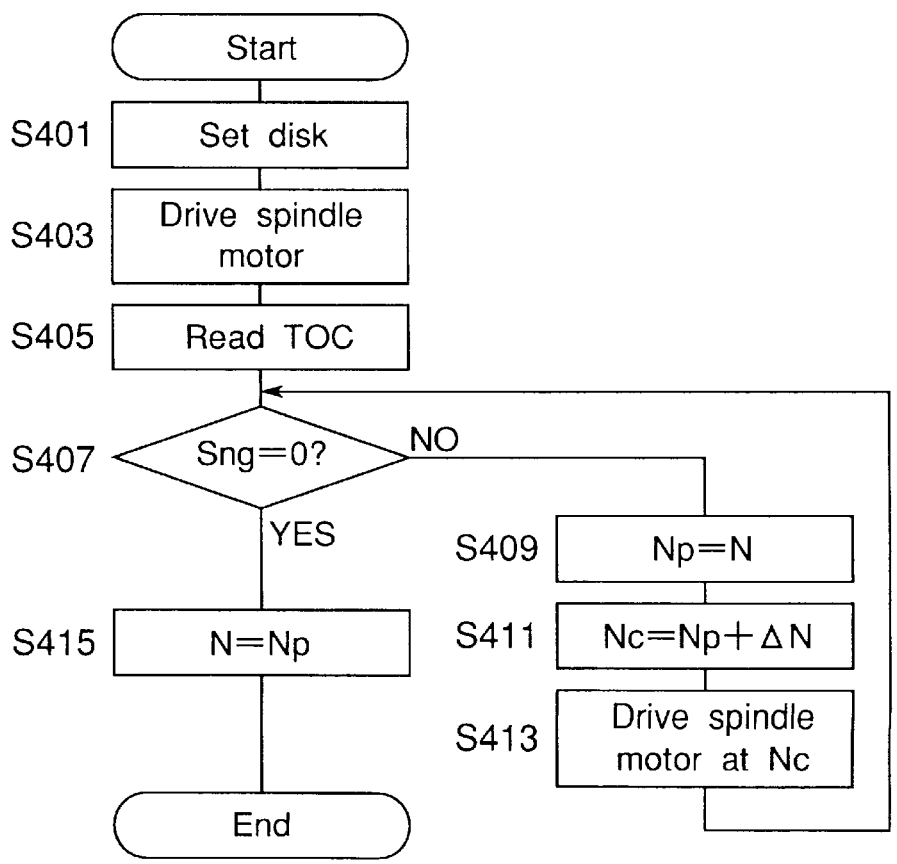
FIG. 24 is a flow chart used to describe a method of obtaining the maximum allowable rotational speed N(Rmax) at a given radial position of a disk-shaped recording medium in an exemplary disk-shaped recording medium reproducing apparatus according to the present invention.

The method of detecting the maximum allowable rotational speed N(Rmax) at any given radial position of the disk-shaped recording medium by a reproducing apparatus exemplary of the present invention is described below with reference to the flow chart in FIG. 24.

When the disk-shaped recording medium is loaded into the reproducing apparatus RAp (step S401), the spindle motor 4 is driven (step S403) to begin spinning the disk-shaped recording medium 1. Thereafter, the disk speed gradually rises until the TOC information can be read (step S405). Based on the TOC information, reproduction of the data recorded to the disk-shaped recording medium 1 then begins.

It is then determined whether the current linear velocity is less than the maximum linear velocity Lvm based on the decoding abnormality signal (step S407). If Sng=0, control advances to S409, and the current rotational speed N is stored as current rotational speed Np. A known margin ΔN is then added to the current rotational speed Np to calculate specified rotational speed Nc. The spindle motor 4 is then driven at the specified rotational speed Nc (step S413), and the procedure loops back to step S407.

It is then tested whether the current linear velocity at the rotational speed increased by ΔN is less than the maximum linear velocity Lvm. This sequences of steps from S407 to S413 is repeated until the current (specified) rotational speed Nc yields a linear velocity exceeding the maximum linear velocity Lvm. When this happens and the decoding abnormality signal=1, the previous current rotational speed Np recorded in step S409 is used as the maximum allowable rotational speed N(Rmax). Both CLV and CAV control are then executed using this maximum allowable rotational speed N(Rmax).

By thus sequentially increasing the rotational speed of the disk-shaped recording medium 1, the actual maximum linear velocity Lvm and maximum allowable rotational speed N(Rmax) that can be used for the specific combination of reproducing apparatus RAp, disk-shaped recording medium 1, and operating environment can be detected and used as the reference speed for rotational control of the reproducing apparatus RAp.

It should be noted that the when step S407 returns NO the current rotational speed Np recorded in the previous step S409 may still be too fast for use as the maximum allowable rotational speed N(Rmax) because of disk wobble, for example. This problem can be resolved by providing a further routine comprising steps similar to S409, S411, and S413.

In this further routine, however, the current rotational speed Np is decreased by ΔN, the spindle motor 4 is driven, and the decoding abnormality signal is evaluated.

It will also be obvious to those skilled in the art that other control methods and apparatuses can be derived from combinations of the various methods and apparatuses of the present invention as taught by the accompanying drawings and descriptions of the invention, and these shall also be considered within the scope of the present invention. Further description of such combinations and variations is therefore omitted below.

The typical operation of a disk-shaped recording medium reproducing apparatus RAp according to the present embodiment of the invention is described briefly below with reference to FIGS. 25 to 28.

The relationship between the control transition point R and rotational speed N optimized by the reproducing apparatus RAp2 of the seventh embodiment and described with reference to FIGS. 18 and 19 is shown by solid line L7 in FIG. 25. The relationship between the rotational speed N and time t is shown by solid line L7t in FIG. 26.

Figure 25:
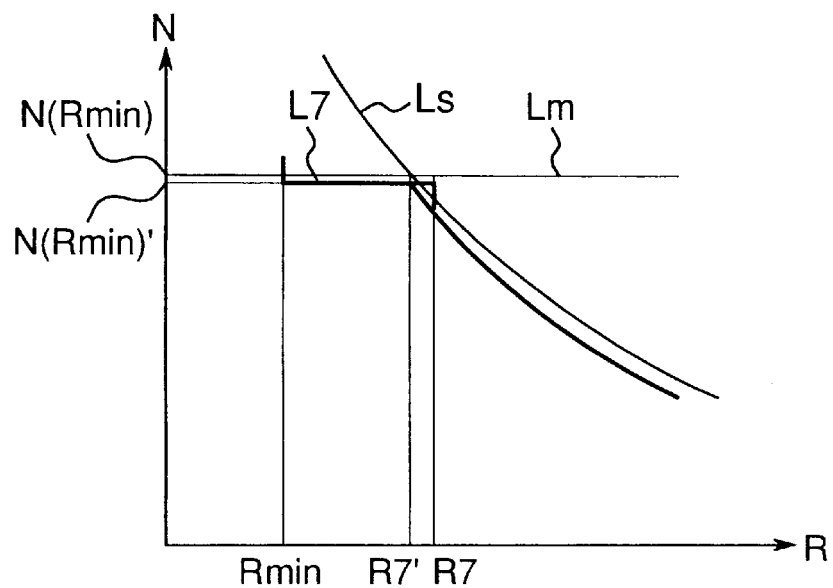
FIG. 25 is a graph showing the relationship between the control transition point R and rotational speed N optimized by a reproducing apparatus RAp according to the seventh embodiment of the invention.

As shown in FIG. 25, the rotational speed N of the disk-shaped recording medium 1 is gradually increased at inside circumferential track Rmin to determine the initial rotational speed N(Rmin) of the motor that the signal processing circuit can process. CAV control is then started using this maximum rotational speed N(Rmin) as the initial rotational speed. Because the decoder 17 will overflow at this rotational speed at radial position R, disk control is switched to CLV control at radial position R7' immediately before the position at which the decoder 17 will overflow.

Figure 26:
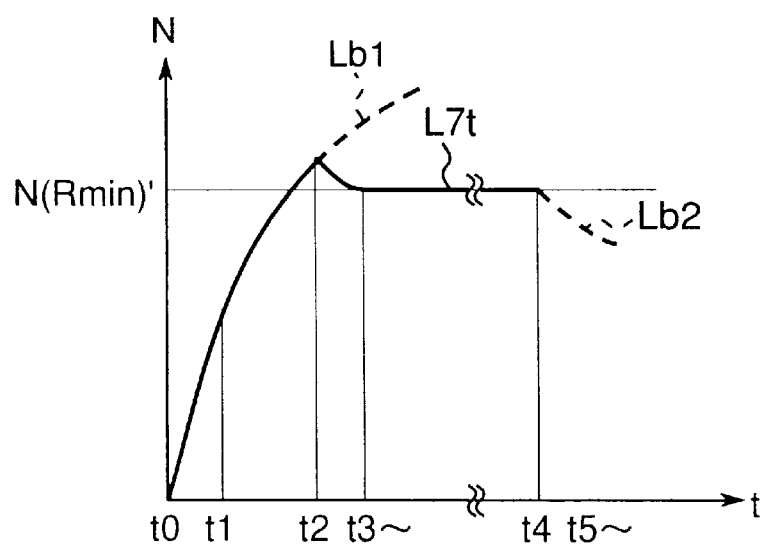
FIG. 26 is a graph showing the relationship between time t and rotational speed N optimized by a reproducing apparatus RAp according to the seventh embodiment of the invention.

Referring to FIG. 26, spindle motor 4 drive starts at time t0, and the speed of disk-shaped recording medium 1 rapidly accelerates. At time t1 the linear velocity passes the minimum operating speed of the signal processing circuit, and the decoding abnormality signal is checked to determine whether an overflow has occurred.

The decoding abnormality signal goes HIGH (=1) at time t2. The disk speed is thus detected to exceed the maximum allowable rotational speed Nmax. The specified rotational speed Nc of the spindle motor 4 is thus gradually decreased until the decoding abnormality signal again goes LOW (=0) at time t3. The maximum rotational speed N(Rmin) is thus obtained. Control therefore continues to time t4 using CAV control at this maximum rotational speed N(Rmin)' until the decoding abnormality signal again goes HIGH (=1) at radial position R7. The specified rotational speed Nc is then again decreased until the decoding abnormality signal again goes LOW (=0) at time t5. CLV control is then used to continue reproduction.

Once the maximum rotational speed N(Rmin) and control transition point R7 are detected, these values can be decreased by ΔN and ΔR to obtain the actual N(Rmin)' and R7' values. When the processing capacity Ls of the signal processing circuit is significantly less than the maximum rotational speed Lm of the mechanical drive system, the radial position R7' (R7) is the inside circumferential track Rmin. CLV control is therefore used for the entire recording area of the disk-shaped recording medium 1.

The signal processing operation of the signal processing circuit is thus constantly monitored using the decoding abnormality signal to maximize performance of the disk-shaped recording medium reproducing apparatus RAp. Maximum performance can therefore be obtained even as characteristics change from heating and simple aging of the apparatus.

Figure 27:
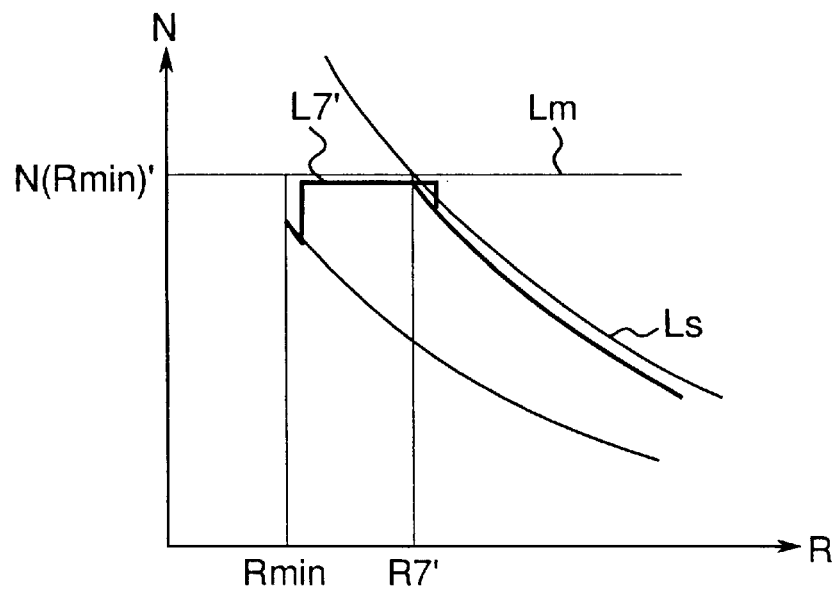
FIG. 27 is a graph showing the relationship between the control transition point R and rotational speed N in a reproducing apparatus RAp according to the invention optimized for reproducing a disk-shaped recording medium in which TOC information is recorded at the inside circumference area of the disk.
Figure 28:
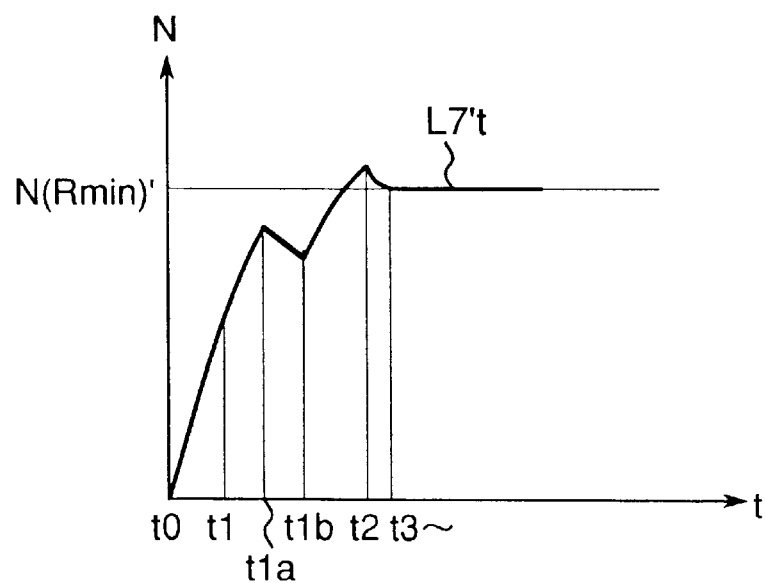
FIG. 28 is a graph showing the relationship between time t and rotational speed N in a reproducing apparatus RAp according to the invention optimized for reproducing a disk-shaped recording medium in which TOC information is recorded at the inside circumference area of the disk.
Figure 29:
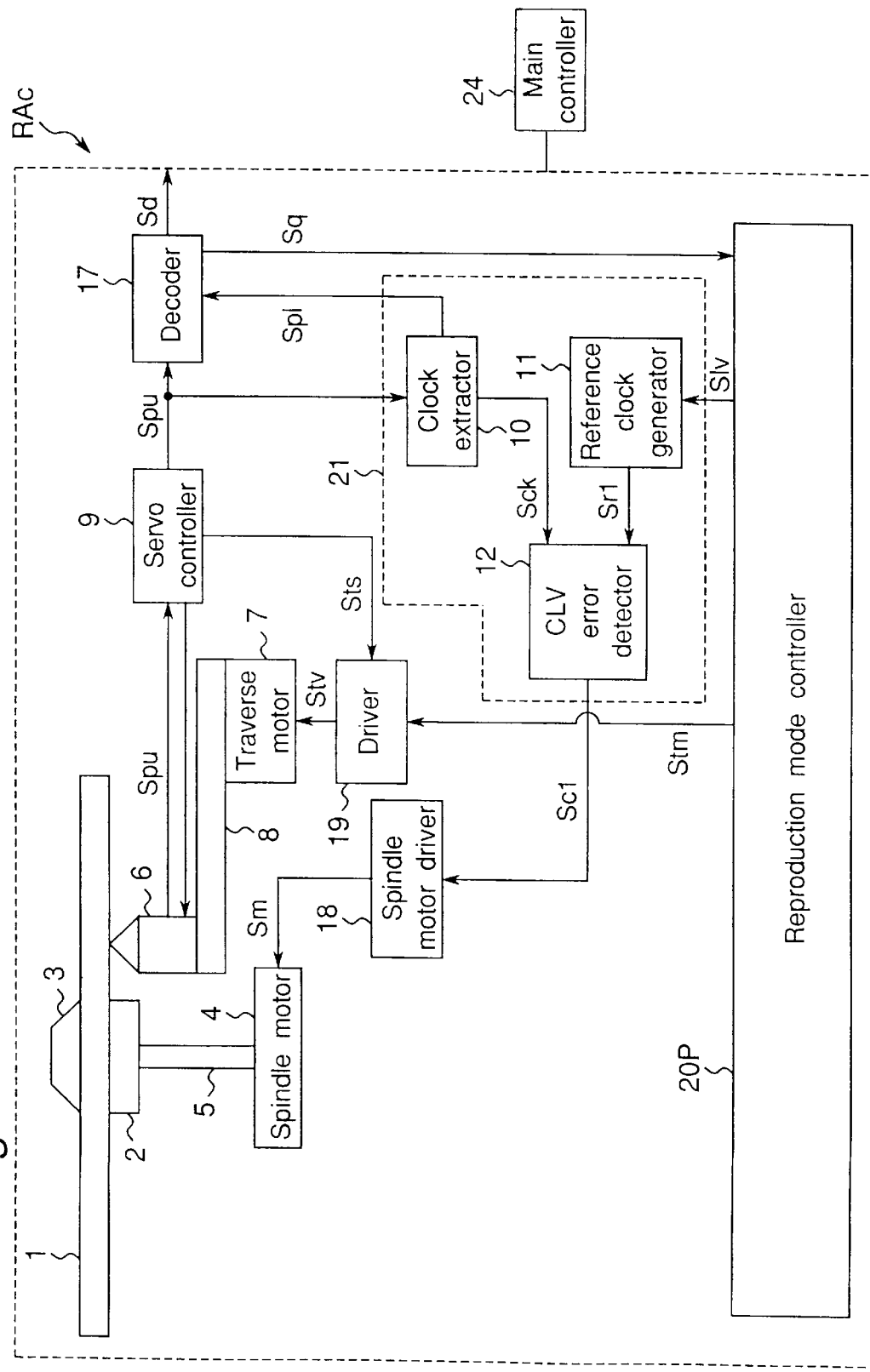
FIG. 29 is a block diagram of a conventional disk-shaped recording medium reproducing apparatus.

The relationship between the control transition point R and rotational speed N is shown by solid line L7' in FIG. 27, and the relationship between the rotational speed N and time t is shown by solid line L7't in FIG. 28 for a reproducing apparatus RAp optimized for CD-ROM media.

Spindle motor 4 drive starts at time t0, and at time t1 the linear velocity passes the minimum operating speed of the signal processing circuit. When the linear velocity at the inside circumferential track Rmin reaches a particular value at time t1a, the rotational speed N(TOC) at time t1a is used as the initial speed for CLV control. The TOC information at the inside circumferential track Rmin is then read, and TOC information reading is completed by time t1b. The speed of the spindle motor 4 is therefore increased again to obtain the maximum allowable rotational speed Nmax.

Operation from time t2 is as described above with reference to FIG. 26. The relationship between the radial position R and rotational speed N at this time can be adjusted to maintain the rotational speed appropriate for the TOC area, CAV area, and CLV area as shown in FIG. 27 to enable rapid reading of information from each of these areas.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A reproducing apparatus for reading information from a recording track, of a plurality of recording tracks, of a disk-shaped recording medium that is rotationally driven at a particular speed, in which the recording track is disposed circumferentially to a center of a recording surface and in which information is recorded to the plurality of recording tracks at a constant linear velocity, comprising:

a pickup means for scanning the recording track and generating a first reproduction signal;

a first rotational drive control means for rotating the disk-shaped recording medium at a constant linear velocity;

a second drive control means for rotating the disk-shaped recording medium at a constant angular velocity;

a rotational drive control means selection means for selecting one of said first rotational drive control means and said second rotational drive control means to read said information recorded at said constant linear velocity, in accordance with a position of said pickup means;

a signal processing means for decode processing said first reproduction signal to generate a second reproduction signal;

a status detection means for generating a monitoring signal indicating whether a normal decoding operation is being performed by said signal processing means, based on said second reproduction signal; and a reproduction means for detecting whether a maximum data rate processable by said signal processing means is exceeded, when said monitoring signal indicates that said decoding operation of said signal processing means is normal.

2. A reproducing apparatus as claimed in claim 1, further comprising:

a first position detection means for detecting the position of the pickup means based on subcode information contained in the reproduction signal.

3. The reproduction apparatus of claim 1, further comprising:

a switching device that detects whether said pickup is at a predetermined given position; and a position detector that detects a radial position of said pickup, based upon a state of said switching device.

4. A reproducing apparatus as claimed in claim 3, wherein:

the reproduction control means comprises a means for calculating the maximum linear velocity corresponding to the maximum data rate.

5. A reproducing apparatus as claimed in claim 4, wherein:

the reproduction control means comprises a means for calculating the rotational speed yielding the maximum linear velocity at any selected radial position.

6. A reproducing apparatus as claimed in claim 5, wherein:

rotational drive control means selection means enables the first rotational drive control means when the pickup means is positioned on the inside circumference side of a first transition point located at a first specified radius of the disk-shaped recording medium, and enables the second rotational drive control means when the pickup means is positioned on the outside circumference side of the first transition point.

7. A reproducing apparatus as claimed in claim 6, wherein:

the rotational speed equivalent to the specified linear velocity at the first transition point is equivalent to the maximum linear velocity at the outside circumference part of the recording surface of the disk-shaped recording medium.

8. A reproducing apparatus as claimed in claim 5, wherein:

rotational drive control means selection means enables the second rotational drive control means when the pickup means is positioned on the inside circumference side of a second transition point located at a first specified radius of the disk-shaped recording medium, and enables the first rotational drive control means when the pickup means is positioned on the outside circumference side of the second transition point.

9. A reproducing apparatus as claimed in claim 8, wherein:

the linear velocity equivalent to a specified rotational speed at the first transition point is equivalent to the maximum linear velocity.

10. A reproducing apparatus as claimed in claim 1, further comprising:

a track cross detection means for generating a track count signal indicating the number of recording tracks crossed by the pickup means based on the reproduction signal; and a second position detection means for detecting the radial position of the pickup means based on the track count signal.

11. A reproducing apparatus as claimed in claim 1, comprising:

a stepping motor for moving the pickup means in the radial direction of the disk-shaped recording medium, and a third position detection means for detecting the radial position of the pickup means based on the drive count of the stepping motor.

12. A reproducing apparatus as claimed in claim 1, comprising:

a switching means for detecting whether the pickup means is at a particular given position, and a fourth position detection means for detecting the radial position of the pickup means based on the state of the switching means.

13. A reproducing apparatus for reading information from a recording track, of a plurality of recording tracks, of a disk-shaped recording medium that is rotationally driven at a particular speed, in which the recording track is disposed circumferentially to a center of a recording surface and in which information is recorded to the plurality of recording tracks at a constant linear velocity, comprising:

a pickup that scans the recording track of the recording medium to generate a reproduction signal;

a first rotational drive controller that controls the recording medium to rotate at a constant linear velocity;

a second drive controller that controls the recording medium to rotate at a constant angular velocity;

a selector that selects one of said first drive controller and said second drive controller, in accordance with a position of said pickup, so as to read said information recorded at said constant linear velocity;

a decoder that decodes said reproduction signal to produce a second reproduction signal;

a status detector that generates a monitoring signal indicating whether a normal decoding operation is being performed by said decoder, based upon said second reproduction signal; and a reproduction controller that determines whether a maximum data rate processed by said decoder has been exceeded, when said monitoring signal, generated by said status detector, indicates an abnormal decoding operation.

14. The reproducing apparatus of claim 13, wherein said position of said pickup is determined in accordance with a subcode information signal reproduced by said pickup.

15. The reproduction apparatus of claim 13, wherein said reproduction controller comprises a calculating device that calculates a maximum linear velocity corresponding to said maximum data rate.

16. The reproduction apparatus of claim 13, further comprising a track cross detector that generates a track count indicating a number of recording tracks crossed by said pickup, based upon said reproduction signal.

17. The reproduction apparatus of claim 13, further comprising:

a stepping motor that moves said pickup in a radial direction relative to said recording medium; and a position detector that detects a radial position of said pickup, based upon a drive count of said stepping motor.

* * * * *

UNITED STATES PATENT AND TRADEMARK OFFICE
CERTIFICATE OF CORRECTION

PATENT NO. : 5,982,728
DATED : November 9, 1999
INVENTOR(S) : K. OKAMOTO et al.

It is certified that error appears in the above-identified patent and that said Letters Patent is hereby corrected as shown below:

At column 29, line 44 (claim 4, line 1) of the printed patent, "3" should be --1--.

Signed and Sealed this

Twenty-seventh Day of March, 2001

Attest:

NICHOLAS P. GODICI

Attesting Officer

Acting Director of the United States Patent and Trademark Office